US012724407B2

(12) United States Patent
Chen et al.

(10) Patent No.: US 12,724,407 B2
(45) Date of Patent: Sep. 1, 2026

(54) VELOCITY ESTIMATION AND OBJECT TRACKING FOR AUTONOMOUS VEHICLE APPLICATIONS

(71) Applicant: Waymo LLC, Mountain View, CA (US)

(72) Inventors: Mingcheng Chen, Mountain View, CA (US); Xiaoxiang Hu, Mountain View, CA (US)

(73) Assignee: Waymo LLC

(*) Notice: Subject to any disclaimer, the term of this patent is extended or adjusted under 35 U.S.C. 154(b) by 72 days.

(21) Appl. No.: 18/965,990

(22) Filed: Dec. 2, 2024

(65) Prior Publication Data

US 2025/0093873 A1 Mar. 20, 2025

Related U.S. Application Data

(63) Continuation of application No. 16/949,275, filed on Oct. 22, 2020, now Pat. No. 12,181,878.

(51) Int. Cl.
*G05D 1/00* (2024.01)
*G01S 7/48* (2006.01)
(Continued)

(52) U.S. Cl.
CPC .......... *G05D 1/0094* (2013.01); *G01S 7/4808* (2013.01); *G01S 7/4817* (2013.01);
(Continued)

(58) Field of Classification Search
CPC .. G05D 1/0094; G05D 1/0088; G05D 1/0212; G05D 1/689; G01S 7/4808;
(Continued)

(56) References Cited

U.S. PATENT DOCUMENTS 8,112,223 B2 2/2012 Jordan et al.
9,250,324 B2 2/2016 Zeng et al.
(Continued)

FOREIGN PATENT DOCUMENTS

CN 106560725 A 4/2017
CN 108027440 A 5/2018
(Continued)

OTHER PUBLICATIONS

Aeye iDAR: "iDAR is Smarter than LiDAR," aeye.ailidar/, 11 Pages, [Retrieved on Oct. 20, 2020].
(Continued)

*Primary Examiner* — Ellis B. Ramirez
(74) *Attorney, Agent, or Firm* — Van Hoven PC; Jordan Becker

(57) ABSTRACT

Aspects and implementations of the present disclosure address shortcomings of the existing technology by enabling velocity estimation for efficient object identification and tracking in autonomous vehicle (AV) applications, including: obtaining, by a sensing system of the AV, a plurality of return points, each return point having a velocity value and coordinates of a reflecting region that reflects a signal emitted by the sensing system, identifying an association of the velocity values and the coordinates of return points with a motion of a physical object, the motion being a combination of a translational motion and a rotational motion of a rigid body, and causing a driving path of the AV to be determined in view of the motion of the physical object.

20 Claims, 11 Drawing Sheets

(51) Int. Cl.

| | |
|---|---|
| ***G01S 7/481*** | (2006.01) |
| ***G01S 7/539*** | (2006.01) |
| ***G01S 17/34*** | (2020.01) |
| ***G01S 17/58*** | (2006.01) |
| ***G05D 1/689*** | (2024.01) |

(52) U.S. Cl.
CPC .............. *G01S 7/539* (2013.01); *G01S 17/34* (2020.01); *G01S 17/58* (2013.01); *G05D 1/0088* (2013.01); *G05D 1/0212* (2013.01); *G05D 1/689* (2024.01)

(58) Field of Classification Search
CPC ...... G01S 7/4817; G01S 7/539; G01S 7/4802; G01S 17/34; G01S 17/58; G01S 17/66; G01S 17/87; G01S 17/89; G01S 17/931; G01S 17/42
USPC ................... 701/23, 514; 356/4.01; 345/419; 340/429
See application file for complete search history.

(56) References Cited

U.S. PATENT DOCUMENTS

| | | | | |
|---|---|---|---|---|
| 9,851,470 | B2 | 12/2017 | Henderson et al. | |
| 10,262,234 | B2 | 4/2019 | Li et al. | |
| 10,620,631 | B1 | 4/2020 | Abeloe | |
| 10,852,419 | B2 | 12/2020 | Zhong et al. | |
| 10,884,131 | B1 | 1/2021 | Allais et al. | |
| 10,884,422 | B2 | 1/2021 | Zhang et al. | |
| 10,891,744 | B1 | 1/2021 | Wyffels | |
| 10,991,105 | B2 | 4/2021 | Fukamachi et al. | |
| 11,029,395 | B1 | 6/2021 | Barber et al. | |
| 11,113,873 | B1 | 9/2021 | Bosse et al. | |
| 11,275,173 | B2 | 3/2022 | Wang | |
| 11,328,210 | B2 | 5/2022 | Mondello et al. | |
| 11,448,735 | B2 | 9/2022 | O'Keeffe | |
| 2004/0169656 | A1* | 9/2004 | David Piponi | G06T 13/80 |
| 2005/0099637 | A1 | 5/2005 | Kacyra et al. | |
| 2005/0285774 | A1 | 12/2005 | Wittenberg et al. | |
| 2007/0219720 | A1 | 9/2007 | Trepagnier et al. | |
| 2010/0161225 | A1 | 6/2010 | Hyung et al. | |
| 2012/0064949 | A1 | 3/2012 | Kavounas | |
| 2014/0028842 | A1 | 1/2014 | Abramson et al. | |
| 2014/0049765 | A1 | 2/2014 | Zheleznyak et al. | |
| 2014/0307247 | A1 | 10/2014 | Zhu et al. | |
| 2014/0347207 | A1 | 11/2014 | Zeng et al. | |
| 2015/0107358 | A1 | 4/2015 | Parke et al. | |
| 2015/0198711 | A1 | 7/2015 | Zeng et al. | |
| 2017/0097410 | A1* | 4/2017 | Liu | G01S 13/589 |
| 2018/0129216 | A1 | 5/2018 | Pasteau et al. | |
| 2018/0136321 | A1 | 5/2018 | Verghese et al. | |
| 2018/0172815 | A1* | 6/2018 | Mckitterick | G01S 13/343 |
| 2018/0283851 | A1* | 10/2018 | Watanabe | G01S 17/89 |
| 2018/0299556 | A1 | 10/2018 | Marcus et al. | |
| 2018/0335787 | A1 | 11/2018 | Zeng et al. | |
| 2018/0348343 | A1 | 12/2018 | Achour et al. | |
| 2019/0011541 | A1 | 1/2019 | O'Keeffe | |
| 2019/0079193 | A1 | 3/2019 | Gunnam | |
| 2019/0120955 | A1 | 4/2019 | Zhong et al. | |
| 2019/0138822 | A1 | 5/2019 | Yao et al. | |
| 2019/0302767 | A1 | 10/2019 | Sapp et al. | |
| 2019/0317219 | A1* | 10/2019 | Smith | B60W 40/04 |
| 2019/0318206 | A1* | 10/2019 | Smith | B60W 40/04 |
| 2020/0041619 | A1 | 2/2020 | Maheshwari et al. | |
| 2020/0117947 | A1 | 4/2020 | Mei et al. | |
| 2020/0182992 | A1 | 6/2020 | Kellner et al. | |
| 2020/0201351 | A1 | 6/2020 | Armstrong-Crews et al. | |
| 2020/0271785 | A1 | 8/2020 | Sebastian et al. | |
| 2020/0301013 | A1* | 9/2020 | Banerjee | G01S 17/931 |
| 2020/0302237 | A1 | 9/2020 | Hennings Yeomans et al. | |
| 2020/0309957 | A1 | 10/2020 | Bhaskaran et al. | |
| 2020/0371228 | A1* | 11/2020 | Wang | G01S 13/931 |
| 2020/0398894 | A1 | 12/2020 | Hudecek et al. | |
| 2020/0400821 | A1 | 12/2020 | Baker et al. | |
| 2021/0001868 | A1* | 1/2021 | Ahn | B60W 50/0097 |
| 2021/0024069 | A1 | 1/2021 | Herman et al. | |
| 2021/0049779 | A1 | 2/2021 | Harviainen | |
| 2021/0056713 | A1* | 2/2021 | Rangesh | G01S 17/89 |
| 2021/0097723 | A1 | 4/2021 | Kim et al. | |
| 2021/0141092 | A1 | 5/2021 | Chen et al. | |
| 2021/0173055 | A1 | 6/2021 | Jian et al. | |
| 2021/0229657 | A1* | 7/2021 | Herman | G07C 5/0816 |
| 2021/0237761 | A1 | 8/2021 | Das et al. | |
| 2021/0255307 | A1 | 8/2021 | Bongio Karrman et al. | |
| 2021/0256321 | A1 | 8/2021 | Gerardo Castro et al. | |
| 2021/0261152 | A1 | 8/2021 | Meijburg et al. | |
| 2021/0261159 | A1 | 8/2021 | Pazhayampallil et al. | |
| 2021/0339738 | A1 | 11/2021 | Lashkari et al. | |
| 2021/0390331 | A1 | 12/2021 | Kellner | |
| 2021/0396887 | A1* | 12/2021 | Schmalenberg | G01S 17/86 |
| 2022/0058402 | A1 | 2/2022 | Hunt | |
| 2022/0119002 | A1 | 4/2022 | Ladd | |
| 2022/0122363 | A1 | 4/2022 | Liong et al. | |
| 2022/0135074 | A1 | 5/2022 | Armstrong-Crews et al. | |
| 2022/0146676 | A1 | 5/2022 | Armstrong-Crews et al. | |
| 2022/0229164 | A1 | 7/2022 | Steinberg et al. | |
| 2022/0262100 | A1 | 8/2022 | Chandler et al. | |
| 2022/0276375 | A1 | 9/2022 | Armstrong-Crews | |
| 2022/0327719 | A1 | 10/2022 | Shaag et al. | |
| 2023/0076905 | A1 | 3/2023 | Wyffels | |

FOREIGN PATENT DOCUMENTS

| | | | | |
|---|---|---|---|---|
| CN | 111612818 A | 9/2020 | | |
| CN | 112041702 A | 12/2020 | | |
| EP | 3151034 A1 | 4/2017 | | |
| EP | 3252501 A1 | 12/2017 | | |
| EP | 3285230 A1 | 2/2018 | | |
| EP | 3346287 A1 | 7/2018 | | |
| EP | 3367121 A1 | 8/2018 | | |
| EP | 3525000 A1 | 8/2019 | | |
| EP | 3367121 B1 | 4/2020 | | |
| EP | 3745158 A1 | 12/2020 | | |
| EP | 3775997 A2 | 2/2021 | | |
| JP | 2012518793 A | 8/2012 | | |
| JP | 2015035019 A | 2/2015 | | |
| JP | 2019049774 A | * | 3/2019 | G01S 7/24 |
| KR | 20200011813 A | 2/2020 | | |
| KR | 20200139779 A | 12/2020 | | |
| WO | 2014168851 A1 | 10/2014 | | |
| WO | 2017038659 A1 | 3/2017 | | |
| WO | 2018127789 A1 | 7/2018 | | |
| WO | 2019154536 A1 | 8/2019 | | |
| WO | 2019199473 A2 | 10/2019 | | |
| WO | 2020176483 A1 | 9/2020 | | |
| WO | 2020210276 A1 | 10/2020 | | |
| WO | 2022087308 A1 | 4/2022 | | |
| WO | 2022094429 A1 | 5/2022 | | |

OTHER PUBLICATIONS

Aurora, "FMCW Lidar: The Self-Driving Game-Changer," Apr. 9, 2020, 6 Pages, [Retrieved on Oct. 20, 2020] Retrieved from URL: medium.com/aurora-blog/fmcw-lidar-the-self-driving-game-changer-194fd311fd0e9.

Cameron O., "An Introduction to LIDAR: The Key Self-Driving Car Sensor," Voyage, May 9, 2017, pp. 1-21.

Extended European Search Report for European Application No. 21883928.0, mailed Aug. 13, 2024, 11 Pages.

Extended European Search Report for European Application No. 21887744.7, mailed Oct. 10, 2024, 10 Pages.

Extended European Search Report for European Application No. 22175897.2, mailed Nov. 2, 2022, 10 Pages.

greencarcongress.com: "Aeva Announces Aeries 4D FMCW Lidar-on-Chip for Autonomous Driving; Recent Porsche Investment," Dec. 12, 2019, 11 Pages, Retrieved from URL: https://www.greencarcongress.com/2019/12/20191212.aeva.html.

Hu Y., et al., "Robust 6-DOF Motion Sensing for an Arbitrary Rigid Body by Multi-view Laser Doppler Measurements," Optics Express, Nov. 27, 2017, vol. 25(24), pp. 30371-30387.

(56) References Cited

OTHER PUBLICATIONS

International Preliminary Report on Patentability for International Application No. PCT/US2021/056105, mailed May 4, 2023, 7 Pages.
International Preliminary Report on Patentability for International Application No. PCT/US2021/057622, mailed May 11, 2023, 7 Pages.
International Preliminary Report on Patentability for International Application No. PCT/US2021/057623, mailed May 11, 2023, 7 Pages.
International Search Report and Written Opinion for International Application No. PCT/US2021/056105, mailed Feb. 15, 2022, 10 Pages.
International Search Report and Written Opinion for International Application No. PCT/US2021/057622, mailed Feb. 18, 2022, 12 Pages.
International Search Report and Written Opinion for International Application No. PCT/US2021/057623, mailed Feb. 23, 2022, 10 Pages.

* cited by examiner

FIG. 10

VELOCITY ESTIMATION AND OBJECT TRACKING FOR AUTONOMOUS VEHICLE APPLICATIONS

RELATED APPLICATIONS

This application is a continuation of U.S. patent application Ser. No. 16/949,275, filed Oct. 22, 2020, entitled "VELOCITY ESTIMATION AND OBJECT TRACKING FOR AUTONOMOUS VEHICLE APPLICATIONS", the contents of which are incorporated by reference in their entirety herein.

TECHNICAL FIELD

The instant specification generally relates to autonomous vehicles. More specifically, the instant specification relates to improving autonomous driving systems and components using velocity sensing data to assist in velocity estimation and object tracking in autonomous driving environments.

BACKGROUND

An autonomous (fully and partially self-driving) vehicle (AV) operates by sensing an outside environment with various electromagnetic (e.g., radar and optical) and non-electromagnetic (e.g., audio and humidity) sensors. Some autonomous vehicles chart a driving path through the environment based on the sensed data. The driving path can be determined based on Global Positioning System (GPS) data and road map data. While the GPS and the road map data can provide information about static aspects of the environment (buildings, street layouts, road closures, etc.), dynamic information (such as information about other vehicles, pedestrians, street lights, etc.) is obtained from contemporaneously collected sensing data. Precision and safety of the driving path and of the speed regime selected by the autonomous vehicle depend on timely and accurate identification of various objects present in the driving environment and on the ability of a driving algorithm to process the information about the environment and to provide correct instructions to the vehicle controls and the drivetrain.

BRIEF DESCRIPTION OF THE DRA WINGS

The present disclosure is illustrated by way of examples, and not by way of limitation, and can be more fully understood with references to the following detailed description when considered in connection with the figures, in which:

FIG. 1A is a diagram illustrating components of an example autonomous vehicle that uses Doppler-assisted object identification and tracking, in accordance with some implementations of the present disclosure.

FIG. 1B is a diagram illustrating example architecture of a perception system of the autonomous vehicle of FIG. 1A that uses Doppler-assisted object identification and tracking, in accordance with some implementations of the present disclosure FIG. 2 is an illustration of a Doppler-assisted object identification and tracking setup that utilizes velocity estimation, as part of a perception system of an autonomous vehicle, in accordance with some implementations of the present disclosure.

FIG. 10 depicts a block diagram of an example computer device that can enable simulations-based testing to improve autonomous vehicle systems using retro-reflection data for real-world materials and obtaining retro-reflection data for real-world materials that can be encountered in driving environments.

SUMMARY

Figure 1A:
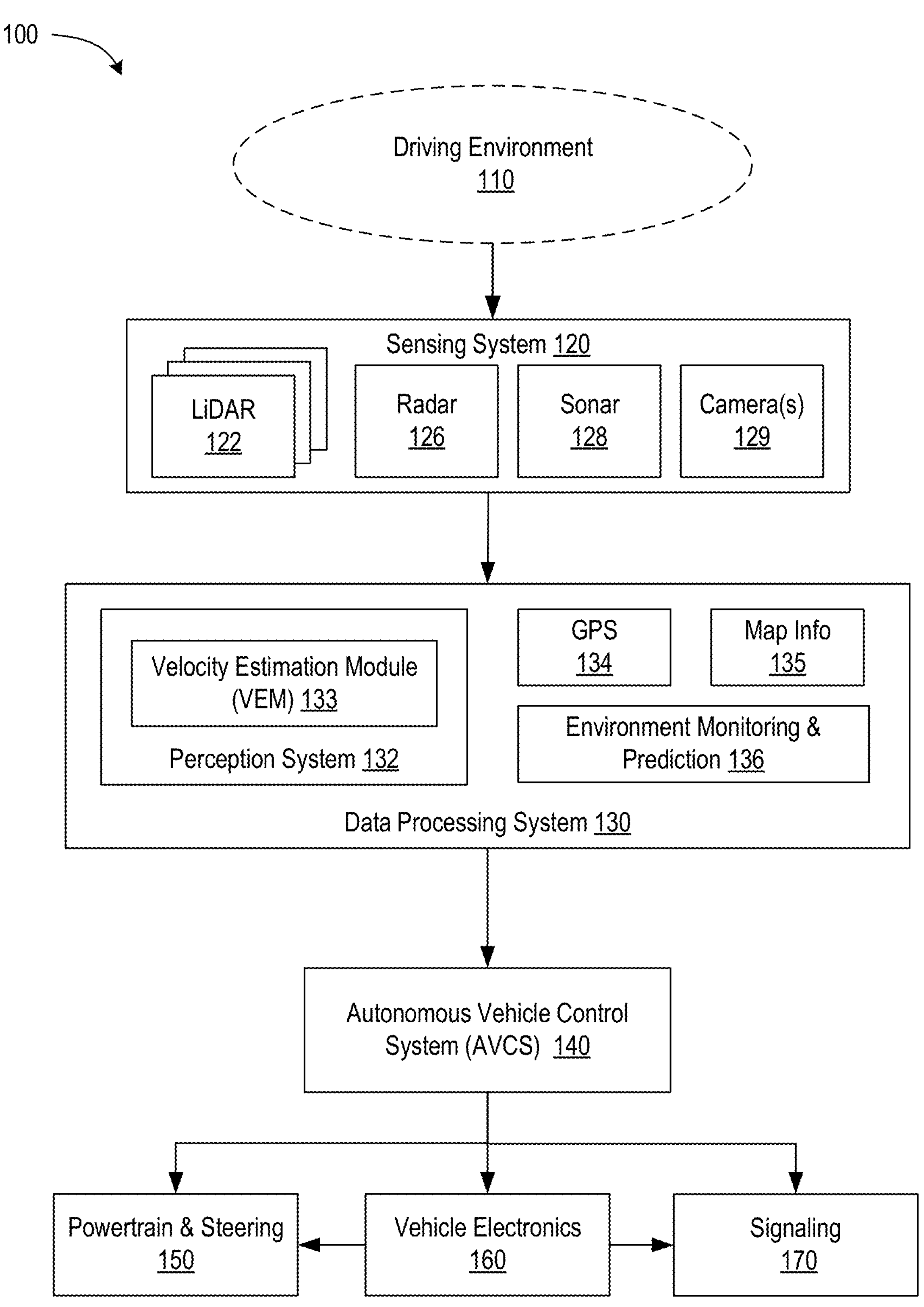

In one implementation, disclosed is a method of obtaining, by a sensing system of an autonomous vehicle (AV), a plurality of return points, each return point comprising a velocity value and one or more coordinates of a reflecting region that reflects a signal emitted by the sensing system, identifying an association of the velocity value and the one or more coordinates of each of the plurality of return points with a motion of a physical object, the motion being a combination of a translational motion and a rotational motion of a rigid body, and causing a driving path of the AV to be determined in view of the motion of the physical object.

In another implementation, disclosed is a system that includes a sensing system of an autonomous vehicle (AV) to obtain a plurality of return points, each return point comprising a velocity value and one or more coordinates of a reflecting region that reflects a signal emitted by the sensing system. The system further includes a perception system of the AV to identify an association of the velocity value and the one or more coordinates of each of the plurality of return points with a motion of a physical object, the motion being a combination of a translational motion and a rotational motion of a rigid body, and cause a driving path of the AV to be determined in view of the motion of the physical object.

In another implementation, disclosed is a non-transitory computer-readable medium having instructions stored thereon that, when executed by a computing device, cause the computing device to obtain, by a sensing system of an autonomous vehicle (AV), a plurality of return points, each return point comprising a velocity value and one or more coordinates of a reflecting region that reflects a signal emitted by the sensing system, identify an association of the velocity value and the one or more coordinates of each of the plurality of return points with a motion of a physical object, the motion being a combination of a translational motion and a rotational motion of a rigid body, and cause a driving path of the AV to be determined in view of the motion of the physical object.

DETAILED DESCRIPTION

An autonomous vehicle can employ a light detection and ranging (lidar) technology to detect distances to various objects in the environment and, sometimes, the velocities of such objects. A lidar emits one or more laser signals (pulses) that travel to an object and then detects arrived signals reflected from the object. By determining a time delay between the signal emission and the arrival of the reflected waves, a time-of-flight (ToF) lidar can determine the distance to the object. A typical lidar emits signals in multiple directions to obtain a wide view of the outside environment. For example, a lidar device can cover an entire 360-degree view by scanning to collect a series of consecutive frames identified with timestamps. As a result, each sector in space is sensed in time increments $\Delta\tau$, which are determined by the angular velocity of the lidar's scanning speed. "Frame" or "sensing frame," as used herein, can refer to an entire 360-degree view of the environment obtained over a scan of the lidar or, alternatively, to any smaller sector, e.g., a 1-degree, 5-degree, a 10-degree, or any other angle obtained over a fraction of the scan cycle (revolution), or over a scan designed to cover a limited angle.

Each frame can include numerous return points (or simply "points") corresponding to reflections from various objects of the environment. Each point can be associated with the distance to the corresponding object or, more specifically, with the distance to an element of the reflective surface of the object (reflecting region) responsible for the respective return point. A set of points can be rendered or otherwise associated with a frame and sometimes referred to as a "point cloud." A point cloud can include returns from multiple objects. Typically, it is not known a priori how many objects are within a given frame. A single object, such as another vehicle, a road sign, a pedestrian, and so on, can generate multiple return points. For example, a 10-degree frame can include returns from one or more road signs, multiple vehicles located at various distances from the lidar device (which can be mounted on the autonomous vehicle) and moving with different speeds in different directions, a pedestrian crossing a roadway, walking along a sidewalk, or standing by the roadside, and many other objects. Segmenting (which can be performed by a perception system of the autonomous vehicle) a given point cloud into clusters that correspond to different objects can be useful in autonomous driving applications. Points that are close (e.g., are separated by a small angular distance and correspond to reflections from similar distances) can nonetheless belong to different objects. For example, a traffic sign and a pedestrian standing close to the sign can generate close return points. Similarly, a car moving along a bicycle in an adjacent lane can generate close return points.

Identification of points that correspond to different objects may be performed using various methods of segmentation and point cloud mapping, such as iterative closest point (ICP) mapping. For example, point cloud mapping can involve forming hypotheses where a selected set (e.g., cluster) of points of a frame identified by a time stamp t is mapped on another set of points of a frame $\tau+\Delta\tau$ with both sets hypothesized to correspond to the same object (e.g. a car or a pedestrian).

ToF lidars are typically used for ranging. ToFs can also be capable of determining the velocity (speed and direction of motion) of a return point by emitting two or more signals (as part of different sensing frames) in a quick succession and detecting the position of the reflecting surface as the surface moves between each additional frame. The intervals between successive signals can be short enough so that the object does not change its position appreciably (between consecutive frames) in relation to other objects of the environment, but still long enough to allow the lidar to accurately detect the changes in the object's position. However, ToF lidar devices are generally incapable of determining velocities of objects based on a single sensing frame.

Aspects and implementations of the present disclosure enables methods of velocity estimation and object tracking, using Doppler-assisted velocity sensing, for various moving objects present in environments of the autonomous vehicles. Specifically, coherent lidars take advantage of a phase information encoded into transmitted signals and carried by the emitted electromagnetic waves to the target and back and provide additional functionality unavailable in the standard ToF lidar technology. A coherent lidar detects changes in the frequency (and the accompanying phase) of the reflected wave induced by the motion of the reflecting surface, a phenomenon known as the Doppler effect. The frequency/phase of the reflected wave is sensitive to the component of the velocity of the reflecting surface $V_r$ that is parallel to the direction of the wave propagation, herein referred to as the "radial" or "longitudinal" velocity. A coherent lidar allows, in addition to obtaining the range information, associating a radial velocity with the return points of the point cloud (radial velocimetry). This additional information, as described in more detail below, enables velocity estimation and tracking of various objects by determining the character of the (translational and rotational) motion performed by the objects. In particular, a motion of a rigid body (such as a body of a car, a truck, an airplane, etc.) is typically constrained by a condition that a distance between two arbitrarily chosen points of the body remains fixed (constant) over the course of its motion. As a consequence, a motion of a rigid body can be described as a combination of a translational motion, which can be described by a translational vector velocity $\vec{V}$ (hereinafter, "velocity") and a rotational motion, which can be described by an angular velocity $\vec{\Omega}$ (hereinafter, "angular velocity"). In the most general case, the two vector velocities amount to six values, e.g., three components of the velocity $\vec{V}=(V_x,V_y,V_z)$ and three components of the angular velocity $\vec{\Omega}=(\Omega_x,\Omega_y,\Omega_z)$, in Cartesian coordinates (or, alternatively, cylindrical, spherical, or any other system of coordinates). As disclosed below, information about the velocities can be determined from a single frame of the sensing system of the AV. The frame can include a mesh of return points (corresponding to reflection of different sensing signals), each return point ("point") P including known coordinates (e.g., known from the directional data of the lidar transmitter and the range data extracted from ToF of the reflected sensing signals) and a radial velocity component (herein "radial velocity") $V_r(P)$ of the reflecting surface corresponding to each point P (e.g., extracted by a coherent lidar sensor from Doppler frequency/phase shifts of the reflected signals). By fitting the coordinates and the radial velocity of multiple points to a rigid body equation parameterized by $\vec{V}$ and $\vec{\Omega}$, a processing device (e.g., a processing device executing AV's data processing system and/or AV's perception system) can determine, e.g., using various fitting algorithms, the value of some or most of the components of the velocity and the angular velocity, based on a single frame.

In some instances, an object can perform such a type of motion that imparts no radial velocity (or little radial velocity) to various regions of the object. For example, a car can be moving in a lateral direction or a wheel is spinning within a plane that is perpendicular to the line of view from the sensor system. In such instances, the full velocity reconstruction can be augmented using one or more additional sensing frames corresponding to other cycles (revolutions) of the transmitter at different (e.g., later or earlier) instances of time, to enable detection of the lateral displacement of the object.

FIG. 1A is a diagram illustrating components of an example autonomous vehicle (AV) 100 that uses Doppler-assisted object identification and tracking, in accordance with some implementations of the present disclosure. FIG. 1A illustrates operations of the example autonomous vehicle. Autonomous vehicles can include motor vehicles (cars, trucks, buses, motorcycles, all-terrain vehicles, recreational vehicle, any specialized farming or construction vehicles, and the like), aircraft (planes, helicopters, drones, and the like), naval vehicles (ships, boats, yachts, submarines, and the like), or any other self-propelled vehicles (e.g., sidewalk delivery robotic vehicles) capable of being operated in a self-driving mode (without a human input or with a reduced human input).

A driving environment 110 can include any objects (animated or non-animated) located outside the AV, such as roadways, buildings, trees, bushes, sidewalks, bridges, mountains, other vehicles, pedestrians, and so on. The driving environment 110 can be urban, suburban, rural, and so on. In some implementations, the driving environment 110 can be an off-road environment (e.g. farming or agricultural land). In some implementations, the driving environment can be an indoor environment, e.g., the environment of an industrial plant, a shipping warehouse, a hazardous area of a building, and so on. In some implementations, the driving environment 110 can be substantially flat, with various objects moving parallel to a surface (e.g., parallel to the surface of Earth). In other implementations, the driving environment can be three-dimensional and can include objects that are capable of moving along all three directions (e.g., balloons, leaves, etc.). Hereinafter, the term "driving environment" should be understood to include all environments in which an autonomous motion of self-propelled vehicles can occur. For example, "driving environment" can include any possible flying environment of an aircraft or a marine environment of a naval vessel. The objects of the driving environment 110 can be located at any distance from the AV, from close distances of several feet (or less) to several miles (or more).

The example AV 100 can include a sensing system 120. The sensing system 120 can include various electromagnetic (e.g., optical) and non-electromagnetic (e.g., acoustic) sensing subsystems and/or devices. The terms "optical" and "light," as referenced throughout this disclosure, are to be understood to encompass any electromagnetic radiation (waves) that can be used in object sensing to facilitate autonomous driving, e.g., distance sensing, velocity sensing, acceleration sensing, rotational motion sensing, and so on. For example, "optical" sensing can utilize a range of light visible to a human eye (e.g., the 380 to 700 nm wavelength range), the UV range (below 380 nm), the infrared range (above 700 nm), the radio frequency range (above 1 m), etc. In implementations, "optical" and "light" can include any other suitable range of the electromagnetic spectrum.

The sensing system 120 can include a radar unit 126, which can be any system that utilizes radio or microwave frequency signals to sense objects within the driving environment 110 of the AV 100. The radar unit can be configured to sense both the spatial locations of the objects (including their spatial dimensions) and their velocities (e.g., using the Doppler shift technology). Hereinafter, "velocity" refers to both how fast the object is moving (the speed of the object) as well as the direction of the object's motion. The term "angular velocity" refers to how fast the object is rotating around some axis as well as the direction of this axis of rotation. For example, a car that is making a left (right) turn has the axis of rotation pointed up (down) and the value of the angular velocity is equal to the rate of change of the angle of rotation (e.g., measured in radians per second).

The sensing system 120 can include one or more lidar sensors 122 (e.g., lidar rangefinders), which can be a laser-based unit capable of determining distances (e.g., using ToF technology) to the objects in the driving environment 110. The lidar sensor(s) can utilize wavelengths of electromagnetic waves that are shorter than the wavelength of the radio waves and can, therefore, provide a higher spatial resolution and sensitivity compared with the radar unit. The lidar sensor(s) can include a coherent lidar sensor, such as a frequency-modulated continuous-wave (FMCW) lidar sensor. The lidar sensor(s) can use optical heterodyne detection for velocity determination. In some implementations, the functionality of a ToF and coherent lidar sensor(s) is combined into a single (e.g., hybrid) unit capable of determining both the distance to and the radial velocity of the reflecting object. Such a hybrid unit can be configured to operate in an incoherent sensing mode (ToF mode) and/or a coherent sensing mode (e.g., a mode that uses heterodyne detection) or both modes at the same time. In some implementations, multiple lidar sensor(s) 122 units can be mounted on AV, e.g., at different locations separated in space, to provide additional information about a transverse component of the velocity of the reflecting object, as described in more detail below.

The lidar sensor(s) 122 can include one or more laser sources producing and emitting signals and one or more detectors of the signals reflected back from the objects. The lidar sensor(s) 122 can include spectral filters to filter out spurious electromagnetic waves having wavelengths (frequencies) that are different from the wavelengths (frequencies) of the emitted signals. In some implementations, the lidar sensor(s) 122 can include directional filters (e.g., apertures, diffraction gratings, and so on) to filter out electromagnetic waves that can arrive at the detectors along directions different from the retro-reflection directions for the emitted signals. The lidar sensor(s) 122 can use various other optical components (lenses, mirrors, gratings, optical films, interferometers, spectrometers, local oscillators, and the like) to enhance sensing capabilities of the sensors.

In some implementations, the lidar sensor(s) 122 can scan 360-degree, such as in a horizontal direction. In some implementations, the lidar sensor 122 can be capable of spatial scanning along both the horizontal and vertical directions. In some implementations, the field of view can be up to 90 degrees in the vertical direction (e.g., with at least a part of the region above the horizon being scanned by the lidar signals). In some implementations, the field of view can be a full sphere (consisting of two hemispheres), e.g., using multiple lidar sensors in aeronautical applications. For brevity and conciseness, when a reference to "lidar technology," "lidar sensing," "lidar data," and "lidar," in general, is made in the present disclosure, such reference shall be understood also to encompass other sensing technology that operate at generally in the near-infrared wavelength, but may include sensing technology that operate at other wavelengths.

The sensing system 120 can further include one or more cameras 129 to capture images of the driving environment 110. The images can be two-dimensional projections of the driving environment 110 (or parts of the driving environment 110) onto a projecting plane (flat or non-flat, e.g. fisheye) of the cameras. Some of the cameras 129 of the sensing system 120 can be video cameras configured to capture a continuous (or quasi-continuous) stream of images of the driving environment 110. The sensing system 120 can also include one or more sonars 128, which can be ultrasonic sonars, in some implementations.

The sensing data obtained by the sensing system 120 can be processed by a data processing system 130 of AV 100. For example, the data processing system 120 can include a perception system 132. The perception system 132 can be configured to detect and track objects in the driving environment 110 and to recognize the detected objects. For example, the perception system 132 can analyze images captured by the cameras 129 and can be capable of detecting traffic light signals, road signs, roadway layouts (e.g., boundaries of traffic lanes, topologies of intersections, designations of parking places, and so on), presence of obstacles, and the like. The perception system 132 can further receive the lidar sensing data (coherent Doppler data and incoherent ToF data) to determine distances to various objects in the environment 110 and velocities (radial and, in some implementations, transverse, as described below) of such objects. In some implementations, the perception system 132 can use the lidar data in combination with the data captured by the camera(s) 129. In one example, the camera(s) 129 can detect an image of a rock partially obstructing a traffic lane. Using the data from the camera(s) 129, the perception system 132 can be capable of determining the angular size of the rock, but not the linear size of the rock. Using the lidar data, the perception system 132 can determine the distance from the rock to the AV and, therefore, by combining the distance information with the angular size of the rock, the perception system 132 can determine the linear dimensions of the rock as well.

In another implementation, using the lidar data, the perception system 132 can determine how far a detected object is from the AV and can further determine the component of the object's velocity along the direction of the AV's motion. Furthermore, using a series of quick images obtained by the camera, the perception system 132 can also determine the lateral velocity of the detected object in a direction perpendicular to the direction of the AV's motion. In some implementations, the lateral velocity can be determined from the lidar data alone, for example, by recognizing an edge of the object (using horizontal scanning) and further determining how quickly the edge of the object is moving in the lateral direction. The perception system 132 can have a velocity estimation module (VEM) 133. VEM 133 can receive one or more sensor data frames from the sensing system 120. Each of the sensor frames can include multiple points. Each point can correspond to a reflecting surface from which a signal emitted by the sensing system 120 (e.g., by lidar sensor(s) 122, etc.) is reflected. The type and/or nature of the reflecting surface can be unknown. Each point can be associated with various data, such as a timestamp of the frame, coordinates of the reflecting surface, radial velocity of the reflecting surface, intensity of the reflected signal, and so on. The coordinates can be spherical (or cylindrical) coordinates, in one implementation. For example, the coordinates can include the radial distance, the polar angle (the angle the direction to the respective reflecting surface makes with the vertical direction or a horizontal plane), and the azimuthal angle (the angle indicating the direction within the horizontal plane). The radial distance can be determined from the lidar data whereas the angles can be independently known from a synchronizer data, a clock data, e.g., based on the known scanning frequency within the horizontal plane. In some implementations, the velocity data can be provided to VEM 133 by one or more of the lidar sensor(s) 122 operating as a coherent lidar sensor (e.g., an FMCW sensor), using Doppler-assisted sensing technology. VEM 133 can use one or more algorithms, as described in more detail below, to reconstruct velocity distributions of various sets of points. The reconstructed velocity can be used by the perception system 132 for efficient and reliable detection and tracking of objects, as described in more detail below.

The perception system 132 can further receive information from a GPS transceiver (not shown) configured to obtain information about the position of the AV relative to Earth. The GPS data processing module 134 can use the GPS data in conjunction with the sensing data to help accurately determine location of the AV with respect to fixed objects of the driving environment 110, such as roadways, lane boundaries, intersections, sidewalks, crosswalks, road signs, surrounding buildings, and so on, locations of which can be provided by map information 135. In some implementations, the data processing system 130 can receive non-electromagnetic data, such as sonar data (e.g., ultrasonic sensor data), temperature sensor data, pressure sensor data, meteorological data (e.g., wind speed and direction, precipitation data), and the like.

The data processing system 130 can further include an environment monitoring and prediction component 136, which can monitor how the driving environment 110 evolves with time, e.g., by keeping track of the locations and velocities of the animated objects (relative to Earth). In some implementations, the environment monitoring and prediction component 136 can keep track of the changing appearance of the environment due to motion of the AV relative to the environment. In some implementations, the environment monitoring and prediction component 136 can make predictions about how various animated objects of the driving environment 110 will be positioned within a prediction time horizon. The predictions can be based on the current locations and velocities of the animated objects as well as on the tracked dynamics of the animated objects during a certain (e.g., predetermined) period of time. For example, based on stored data for object 1 indicating accelerated motion of object 1 during the previous 3-second period of time, the environment monitoring and prediction component 136 can conclude that object 1 is resuming its motion from a stop sign or a red traffic light signal. Accordingly, the environment monitoring and prediction component 136 can predict, given the layout of the roadway and presence of other vehicles, where object 1 is likely to be within the next 3 or 5 seconds of motion. As another example, based on stored data for object 2 indicating decelerated motion of object 2 during the previous 2-second period of time, the environment monitoring and prediction component 136 can conclude that object 2 is stopping at a stop sign or at a red traffic light signal. Accordingly, the environment monitoring and prediction component 136 can predict where object 2 is likely to be within the next 1 or 3 seconds. The environment monitoring and prediction component 136 can perform periodic checks of the accuracy of its predictions and modify the predictions based on new data obtained from the sensing system 120.

The data generated by the perception system 132, the GPS data processing module 134, and the environment monitoring and prediction component 136 can be used by an autonomous driving system, such as AV control system (AVCS) 140. The AVCS 140 can include one or more algorithms that control how AV is to behave in various driving situations and environments. For example, the AVCS 140 can include a navigation system for determining a global driving route to a destination point. The AVCS 140 can also include a driving path selection system for selecting a particular path through the immediate driving environment, which can include selecting a traffic lane, negotiating a traffic congestion, choosing a place to make a U-turn, selecting a trajectory for a parking maneuver, and so on. The AVCS 140 can also include an obstacle avoidance system for safe avoidance of various obstructions (rocks, stalled vehicles, a jaywalking pedestrian, and so on) within the driving environment of the AV. The obstacle avoidance system can be configured to evaluate the size of the obstacles and the trajectories of the obstacles (if obstacles are animated) and select an optimal driving strategy (e.g., braking, steering, accelerating, etc.) for avoiding the obstacles.

Algorithms and modules of AVCS 140 can generate instructions for various systems and components of the vehicle, such as the powertrain and steering 150, vehicle electronics 160, signaling 170, and other systems and components not explicitly shown in FIG. 1. The powertrain and steering 150 can include an engine (internal combustion engine, electric engine, and so on), transmission, differentials, axles, wheels, steering mechanism, and other systems. The vehicle electronics 160 can include an on-board computer, engine management, ignition, communication systems, carputers, telematics, in-car entertainment systems, and other systems and components. The signaling 170 can include high and low headlights, stopping lights, turning and backing lights, horns and alarms, inside lighting system, dashboard notification system, passenger notification system, radio and wireless network transmission systems, and so on. Some of the instructions output by the AVCS 140 can be delivered directly to the powertrain and steering 150 (or signaling 170) whereas other instructions output by the AVCS 140 are first delivered to the vehicle electronics 160, which generate commands to the powertrain and steering 150 and/or signaling 170.

In one example, the AVCS 140 can determine that an obstacle identified by the data processing system 130 is to be avoided by decelerating the vehicle until a safe speed is reached, followed by steering the vehicle around the obstacle. The AVCS 140 can output instructions to the powertrain and steering 150 (directly or via the vehicle electronics 160) to 1) reduce, by modifying the throttle settings, a flow of fuel to the engine to decrease the engine rpm, 2) downshift, via an automatic transmission, the drivetrain into a lower gear, 3) engage a brake unit to reduce (while acting in concert with the engine and the transmission) the vehicle's speed until a safe speed is reached, and 4) perform, using a power steering mechanism, a steering maneuver until the obstacle is safely bypassed. Subsequently, the AVCS 140 can output instructions to the powertrain and steering 150 to resume the previous speed settings of the vehicle.

Figure 1B:
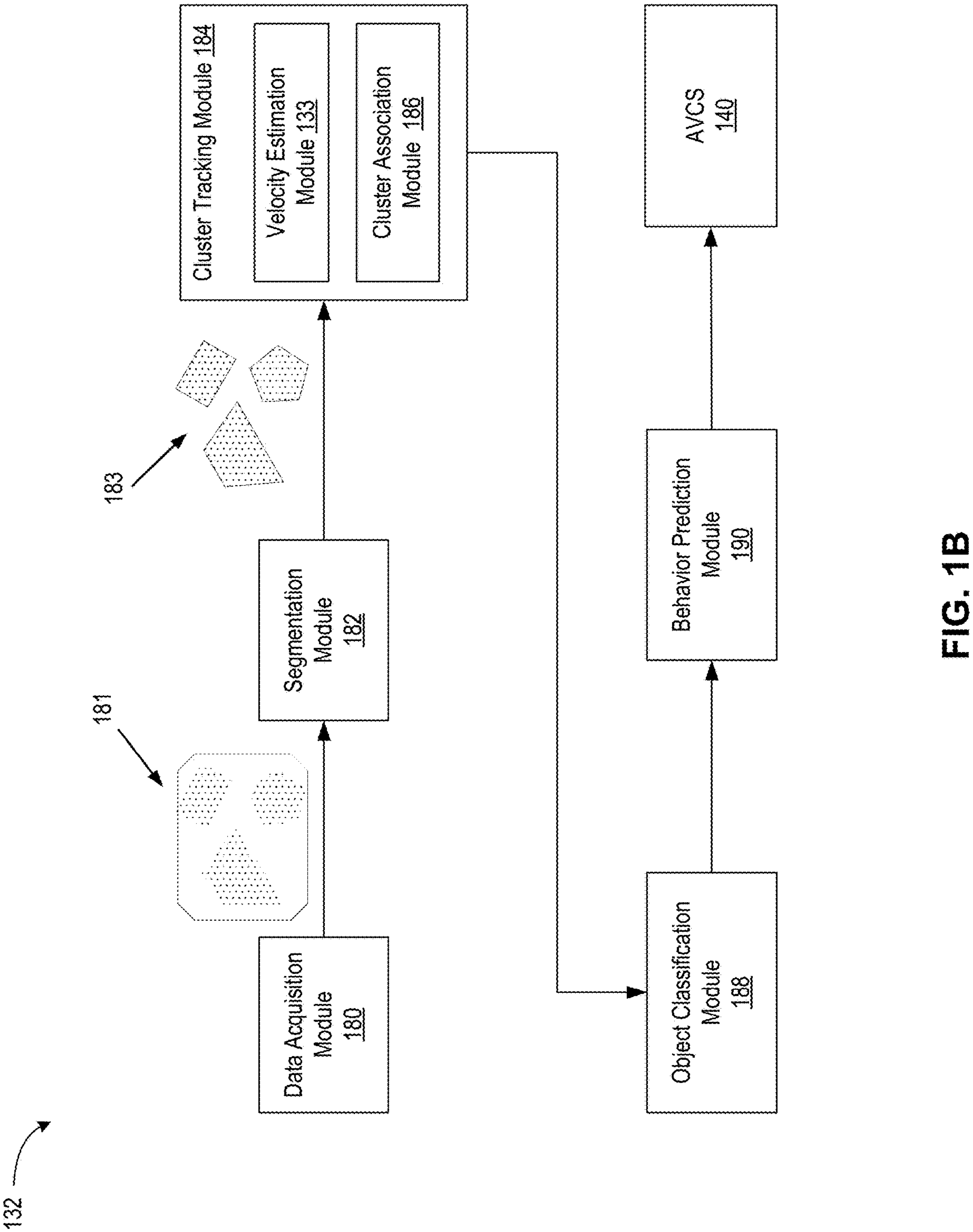

FIG. 1B is a diagram illustrating example architecture of a perception system of the autonomous vehicle of FIG. 1A that uses Doppler-assisted object identification and tracking, in accordance with some implementations of the present disclosure. A perception system illustrated in FIG. 1B can be perception system 132 of FIG. 1A, in one implementation. An input into perception system 132 may be data obtained by sensing system 120, including distance data obtained and radial velocity data obtained by lidar sensor(s) 122. For example, a data acquisition module 180 may associate each (return) point with coordinates and radial velocities of the respective reflecting region. Various points may correspond to different frames, each frame having a timestamp. In some implementations, to account for a rolling shutter that outputs sensing signals sequentially around the field of view, data acquisition block 180 may associate an individual time stamp with each point, by modifying a global reference timestamp of the respective frame with a time correction within a given frame. Output of data acquisition module 180 can be a point cloud 181 of points corresponding to a sensing frame or a portion of such a frame. Point cloud 181 can be input into a segmentation module 182 where various points of point cloud 181 can be grouped into clusters 183 corresponding to different objects. Segmentation can be performed using a variety of approaches. Clusters can be grouped based on proximity of points in space, proximity of radial velocities of various points, or both. In some implementations, segmentation can use various mapping algorithms (such as ICP) that are capable of mapping points of two different sensing frames. Segmentation can involve formation and verification of hypotheses; for example, a hypothesis that a certain cluster corresponds to a single object can be confirmed or disproved based on distribution of measured (radial) velocities of the points in the cluster, on evolution of the cluster between different sensing frames, and/or by other methods and techniques. Confirmed hypotheses (e.g., output clusters 183) can be provided to a cluster tracking module 184. Cluster tracking module 184 can perform velocity estimation of an object that corresponds to all or at least some identified clusters 183. In some implementations, velocity estimation can be performed by VEM 133, as disclosed in more detail below. In particular, VEM 133 may use velocity data, obtained by one or more lidar sensors, to identify (e.g. estimate, with accuracy determined by precision of the distance and velocity measurements) translational V and rotational 2 velocities of the objects that correspond to the identified clusters 183. In some implementations, identification of V and 22 can be performed based on a single sensing frame. In some implementations, complete identification of V and can be performed using multiple sensing frames. In some implementations, velocity estimation can be used to track motion of the objects, using clusters of points from different sensing frames (sensing frames with different timestamps).

Perception system 132 can also use cluster association module 186 for object tracking. Cluster association module 186 can identify clusters belonging to different sensing frames as being associated with the same object, to facilitate tracking of the object's motion as a function of time. Using velocity estimation and cluster associations, objects identified by cluster tracking module 184 may be classified by object classification module 188 as being of a particular type (class), such as cars, trucks, buses motorcycles, bicyclists, pedestrians, stationary objects, and so on. Object classification can be performed using various features of the tracked clusters, such as size, positions, velocity (both rotational and translational), pattern of motion (e.g., how often an object stops, how quickly an object accelerates/decelerates), motion in relation to other objects and so on. Based on classification of various objects by object classification module 188 as well as previously tracked motion of the objects (by cluster tracking module 184), a behavior prediction module 190 can forecast how the identified objects are likely to move within a certain time horizon, e.g., whether a truck is likely to stop before an intersection, cross the intersection without stopping, turn at the intersection, and so on. Behavior prediction module 190 can also forecast velocity and acceleration/deceleration of the identified objects, responses of the objects to changing traffic and road conditions, and so on. Information from (e.g., forecasts) from behavior prediction module 190 can be provided to AVCS 140 to enable driving path selection, as described above in relation to FIG. 1A.

Figure 2:
Figure 2:
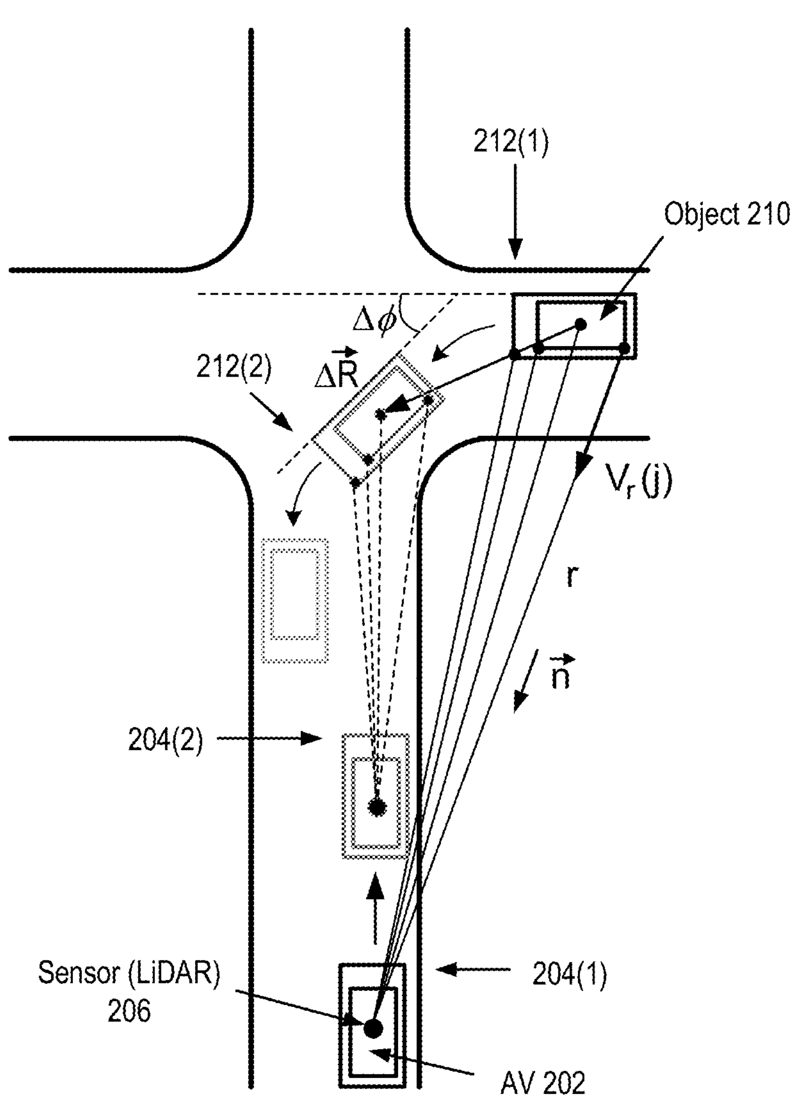

FIG. 2 is an illustration 200 of a Doppler-assisted object identification and tracking setup that utilizes velocity estimation, as part of a perception system of an autonomous vehicle, in accordance with some implementations of the present disclosure. Depicted in FIG. 2 is AV 202 (which can be AV 100 or any other AV) approaching an intersection. The AV 202 has a sensor 206, which can be a lidar, such as a coherent lidar, an FMCW lidar, a hybrid coherent/ToF lidar, a combination of a coherent and incoherent lidar, etc., or any other device that allows to sense the radial velocity information in addition to the range (distance) information. The sensor 206 scans the driving environment of AV 202. In particular, the sensor 206 can sense multiple return points for each sensing frame. The sensing frames can be separated by time increments $\Delta\tau$. The time increments refer to time differentials between signals emitted into (or returned from) the same direction, as different directions can be probed with signals at slightly different times. More specifically, $\Delta\tau$ can be a duration of the sensor (e.g., lidar transmitter) cycle (e.g., a period between consecutive scans of the same region again), e.g., with N points along a 360-degree horizontal view, so that any two adjacent directions of sensing can be probed with the time lead/lag of $\Delta\tau/N$.

An object 210 (e.g., a car, a truck, a bus, a motorcycle, or any other object) can be approaching the intersection and making a left turn, as depicted in FIG. 2. Two consecutive locations of AV, e.g., 204(1) and 204(2), corresponding to two consecutive lidar frames taken at times $\tau$ and $\tau+\Delta t$ are shown. Similarly, the locations of object 210 for the two frames $\tau$ and $\tau+\Delta t$ are shown as 212(1) and 212(2), respectively.

It should be understood that the displacement of AV 202 and object 210 shown in FIG. 2 between two consecutive frames is exaggerated for illustrative purposes and that, in reality, various objects can change their locations over the time increment $\Delta\tau$ much less significantly than depicted. For example, there can be numerous frames obtained by sensor 206 while object 210 completes the left-hand turn depicted in FIG. 2.

Object 210 performs a combination of a translational motion and a rotational motion. For example, some reference point of the object 210 is translated by vector $\Delta\vec{R}$ and the object 210 is rotated around this reference point by angle 40. In a flat driving environment, it can be sufficient to describe rotational motion via a single-component value $\Delta\phi$, but in non-flat 3D (in particular, flying or nautical) environments, the rotation angle can be a vector $\Delta\vec{\phi}$ whose three components describe pitch angle, yaw angle, and roll angle, respectively. The angular velocity of the object 210 characterizes the rate at which the object 210 is rotating (turning), $\vec{\Omega}=\Delta\vec{\phi}/\Delta\tau$. The linear velocity of the reference point similarly determines the rate at which the object 210 is translating, $\vec{V}=\Delta\vec{R}/\Delta\tau$. Provided that the object 210 is rigid, the knowledge of the angular velocity $\vec{\Omega}$ and the linear velocity $\vec{V}$ of some reference point O (with coordinates $\vec{R}_O$) enables the determination of the velocity of other points, as described in more detail below.

As shown in FIG. 2, at location 212(1) object 210 can reflect a number of signals (indicated by solid lines) output by the sensor 206 and generate a number of return points (shown with black circles) of the first frame. The return points should be understood as data entries (e.g., indexed by the angular directions of the output signals, or in any other way) generated by the perception system 132 based on the measurements performed by sensor 206, as part of the sensing system 120. Each return point can include: (1) distance r to the actual physical reflecting region, and (2) the radial velocity $V_r(j)$ that is equal to the component of the velocity $\vec{V}(j)$, associated with the j-th point. The radial velocity is the component of the vector velocity along the direction (described by unit vector $\vec{n}$) towards (or away from) the sensor 206: $V_r(j)=\vec{V}(j)\cdot\vec{n}$. In some implementations, only some of the return points can include the radial velocity values. For example, while ToF range measurements can be performed for each return point, only some (e.g., every fifth, tenth, and so on) of the points can be probed with the coherent lidar and include the velocity data. The radial velocity $V_r(j)$ is the velocity measured in the reference frame of the AV 202. Accordingly, because in a general case the AV 202 is also moving, the measured velocity $V_r(j)$ can be different from the velocity of the respective physical point of reflection relative to the ground, which can then be determined by adding (in vector form) the velocity of the object 210 measured in the AV 202 frame to the velocity of the AV 202 with respect to the ground (which can be known independently, e.g., from speedometer/odometer data, map/GPS data, etc.). At location 212(2), the object 220 can similarly reflect a new set of signals (indicated by dashed lines) output by the sensor 206 and generate a number of return points of the second frame. Segmentation module 182 may execute various segmentation and point cloud mapping algorithms to output clusters of points that correspond to various objects in the driving environment.

Figure 3:
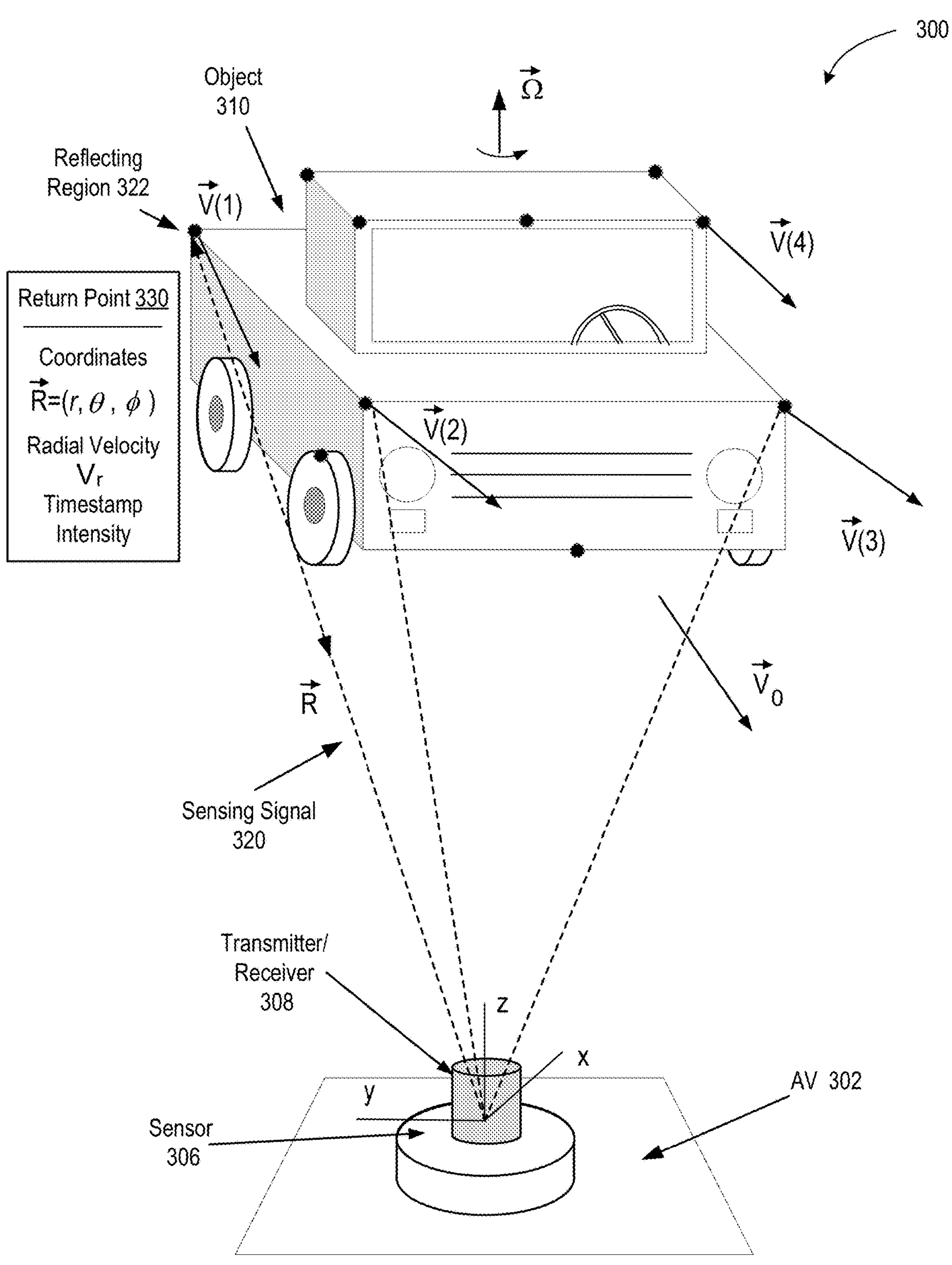
FIG. 3 is an illustration of a velocity estimation setup, as part of a perception system of an autonomous vehicle, in accordance with some implementations of the present disclosure.

FIG. 3 is an illustration 300 of a velocity estimation setup, as part of a perception system of an autonomous vehicle, in accordance with some implementations of the present disclosure. Depicted is an object 310 (e.g., a car, a truck, etc.) that is moving with some translational velocity $\vec{V}_O$ (e.g. moving forward) while simultaneously rotating with angular velocity $\vec{\Omega}$ (e.g., making a left turn). Also shown is a part of the AV 302 with a sensor 306 mounted thereon. Sensor 306 can include a scanning transmitter/receiver 308 capable of transmitting and receiving sensing (e.g., laser, radar, etc.) signals that probe the outside (relative to AV 302) environment. One sensing frame that corresponds to a single cycle of the transmitter 308 can produce multiple return points from various reflecting regions (depicted with black circles) of the object 310.

A sensing signal 320 can be emitted by a transmitting circuit of the transmitter/receiver 308, reflect from a reflecting region 322 of the object 310, return along the same path and be received by a receiving circuit of the transmitter/receiver 308. The sensing system 120 can associate a return point 330 with the sensing signal 320 and/or reflecting region 322. The return point 330 can include various data that can be extracted from the sensing signal 320, such as the coordinates (which can be in any appropriate system of coordinates, e.g., Cartesian coordinates $\vec{R}=(x,y,z)$, spherical coordinates $\vec{R}=(r,\theta,\phi)$, cylindrical coordinates $\vec{R}=(r,\phi,z)$, or any other system of coordinates; the origin of the coordinate system can be associated with the transmitter/receiver 308, as shown. The returns point can also include such data as the radial velocity $V_r$, a timestamp $\tau$ associated with the sensing signal 320 (e.g., the time of the signal emission or return), the intensity of the returned signal, and other information such as the polarization of the emitted and/or received signal, and the like. Although only the data associated with the return point 330 is depicted in FIG. 3, other return points associated with the reflecting regions depicted with black circles can include the same or similar type of information. Because the object 310 can be rotating, the velocities of each of the reflecting regions, $\vec{V}(1)$, $\vec{V}(2)$, $\vec{V}(3)$, $\vec{V}(4)$ . . . , can be different from each other. Correspondingly, the detected radial velocities associated with each return point, $V_r(1)$, $V_r(2)$, $V_r(3)$, $V_r(4)$ . . . , can likewise be different from each other. This difference in the detected radial velocities can be used by VEM 133 for estimation of the full motion of the object 310.

Specifically, if the object 310 is a rigid body, the velocity of an element of the object having a radius-vector $\vec{R}$ can be found from the rigid body equation:

$$\vec{V}=\vec{V}_O+\vec{\Omega}\times\left(\vec{R}-\vec{R}_O\right),$$

where $\vec{R}_O$ is the radius vector of some reference point. The reference point can be any element of the object, e.g. an element associated with the return point (3) or any other return point. The choice of the reference point O can be arbitrary since the same rigid body equation exists for any other reference point O', as $$\begin{aligned}\vec{V}&=\vec{V}_O+\vec{\Omega}\times\left(\vec{R}-\vec{R}_{O'}-\vec{R}_O+\vec{R}_{O'}\right)\\&=\vec{V}_{O'}+\vec{\Omega}\times\left(\vec{R}-\vec{R}_{O'}\right),\end{aligned}$$

where $\vec{V}_{O'}=\vec{V}_O+\vec{\Omega}\times(\vec{R}_{O'}-\vec{R}_O)$ is the linear velocity of the other reference point O'. Although the linear velocity changes when the reference point is changed, the angular velocity is independent of the choice of the reference point. This independence provides additional flexibility to choose the reference point based on convenience (e.g., near the center of the cluster of points detected by the sensing system 120).

Figure 4:
FIG. 4 is a schematic depiction of one possible geometric representation that can be used for velocity estimation of object motion by a perception system of an autonomous vehicle, in accordance with some implementations of the present disclosure.
Figure 4:
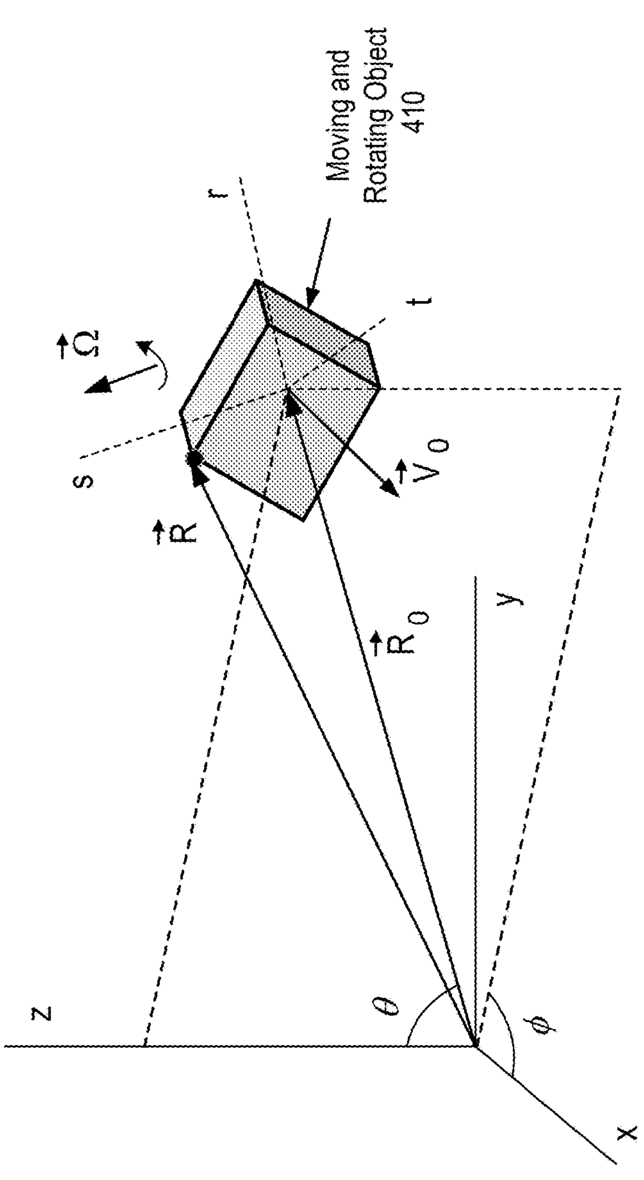

FIG. 4 is a schematic depiction of one possible geometric representation 400 that can be used for velocity estimation of object motion by a perception system of an autonomous vehicle, in accordance with some implementations of the present disclosure. Depicted schematically is a moving and rotating object 410 (e.g., a car, a plane, a body of a motorcycle, etc.) having translational velocity $\vec{V}_O$ and angular velocity $\vec{\Omega}$. Shown is a fixed system of coordinates x, y, z which can be associated with the AV (not shown), e.g., with any axes having fixed directions relative to the AV. A reference point $\vec{R}_O$ can be chosen (in some arbitrary manner) within a cluster of the return points. The reference point $\vec{R}_O$ can be chosen independently for any cluster of return points. For example, a first cluster of points corresponding to a truck located straight ahead relative to the AV can be analyzed using one reference point (e.g., some point in the middle of the cluster) whereas a second cluster of points, corresponding to a car located to the left of the AV, can be analyzed using a completely different reference point $\vec{R}_O$.

A second coordinate system can be associated with the reference point, e.g., a system of coordinates r, s, t in which the first axis r is parallel to the direction of the radius vector $\vec{R}_O$, axis t is perpendicular to axis r and parallel to the horizontal plane xy, and axis s is perpendicular to both the first axis and the second axis. The directions (unit vectors) of the axes of the second coordinate system in terms of the polar angle $\theta$ and azimuthal angle $\phi$ of the radius vector $\vec{R}_O$ are $$\hat{r}=\sin\theta\cos\phi\hat{x}+\sin\theta\sin\phi\hat{y}+\cos\theta\hat{z},$$

$$\hat{s}=-\cos\theta\cos\phi\hat{x}-\cos\theta\sin\phi\hat{y}+\sin\theta\hat{z},$$

$$\hat{t}=\sin\phi\hat{x}-\cos\phi\hat{y}.$$

The radial component of the velocity ("radial velocity"), as detected by, e.g., the lidar sensor is the dot product of the velocity $\vec{V}$ and the unit vector along the direction of the radius-vector of the return point $\vec{R}$: $V_r=\vec{V}\cdot\vec{R}/R$, where R is the magnitude of the radius vector (e.g., the distance from the sensor to the return point). According to the rigid body equation, the radial velocity is $$V_r=\vec{V}_O\cdot\frac{\vec{R}}{R}+\left(\vec{R}_O\times\vec{\Omega}\right)\cdot\frac{\vec{R}}{R}.$$

Given that in the coordinate system r, s, t, the radius-vector $\vec{R}=(R,0,0)$, and the angular velocity $\vec{\Omega}=(\Omega_r,\Omega_s,\Omega_t)$, the cross-product is $\vec{R}\times\vec{\Omega}=-R_0\Omega_t\vec{s}+R_0\Omega_s\hat{t}$. Computing the dot product of the cross-product with the radius-vector R expressed using the second coordinate system (as $\vec{R}=r\hat{r}+s\hat{s}+t\hat{t}$), the radial velocity can be expressed as, $$V_r=V_{0r}\frac{r}{R}+(V_{0s}-R_0\Omega_t)\frac{s}{R}+(V_{0t}+R_0\Omega_s)\frac{t}{R}.$$

A cluster of N points j=1, 2, 3 . . . . N, which corresponds to a single (rigid) object, can have N known radius vectors $\vec{R}(j)=r(j)\hat{r}+s(j)\hat{s}+t(j)\hat{t}$ and N known radial velocities $V_r(j)$. Accordingly, VEM 133 can form N linear equations, $$V_r(j)=V_{0r}\frac{r(j)}{R(j)}+(V_{0s}-R_0\Omega_t)\frac{s(j)}{R(j)}+(V_{0t}+R_0\Omega_s)\frac{t(j)}{R(j)},$$

for three unknown quantities, such as the radial component of the translational velocity $V_{0r}$ and the two combinations $V_{0s}-R_0\Omega_t$ and $V_{0t}+R_0\Omega_s$, each constructed with one lateral component of the translational velocity and one lateral component of the angular velocity.

Consequently, a minimum of three return points can be sufficient to determine the three independent variables $X_1=V_{0r}$, $X_2=V_{0s}-R_0\Omega_t$, and $X_3=V_{0t}+R_0\Omega_2$, that characterize the distribution of velocities of a rigid body. If more than three return points are available, the system of linear equations is over-determined. Accordingly, selecting (e.g., randomly) any three equations from the system of N linear equation would determine a set of variables $X_1,X_2,X_3$ that are, generally, different from the variables obtained using some other different set. In various implementations, different schemes can be used to improve accuracy of velocity determination using the over-determined system of equations. In some implementations, the variables $X_1$, $X_2$, $X_3$ can be determined by averaging various values $X_1,X_2,X_3$ obtained from different sets of (e.g., randomly selected) equations, up to the total number N(N−1)(N−2)/6 of possible sets. In some implementations, outlier sets of $X_1,X_2,X_3$ can be discarded, based on various known filtering algorithms.

In some implementations, the variables $X_1,X_2,X_3$ can be determined using regression analysis methods, such as the least square error method. For example, a loss function can be defined as a sum of squared errors, $$L(X_1, X_2, X_3) = \sum_{j=1}^{N}[V_r(j) - V_r(X_1, X_2, X_3)]^2,$$

between measured radial velocities $V_r(j)$ and evaluated radial velocities $V_r(X_1,X_2,X_3)$; e.g., $V_r(X_1,X_2,X_3)=(rX_1+sX_2+tX_3)/R$. In this scheme, different return points j are weighted identically, but in other implementations various points j can be weighted differently. For example, points that are closer to the sensor (smaller distances R) can be weighted more than points that are farther away from the sensor.

Even though the knowledge of the radial velocities enables to find three independent representations ($V_{0r}$, $V_{0s}-R_0\Omega_t$, $V_{0t}+R_0\Omega_s$) of the six components of the translational and angular velocities, in various implementations, the determination can be even more complete. For example, from the planar two-dimensional nature of the motion in a specific context (e.g., related to driving on roads of a flat surface or a surface of known profile), some of the variables can be independently known. For example, it can be known that a vertical component of the translational velocity $V_{0s}$ is zero, or unambiguously related to the radial velocity $V_{0r}$ based on a known (e.g., from map data) profile of the ground terrain. In such instances the determination of the variable $X_2$ unambiguously identifies the rate of rotation $\Omega_t$ around the horizontal axis t. Such rotation is often associated with wheels of various vehicles-cars, bicycles, motorcycles, and so on. The rate of rotation $\Omega_t$ of a spinning wheel can further be verified from the profile of radial velocities of different points of the wheel. For example, the velocity of the wheel (relative to the ground) at a point where the wheel makes contact with the road is zero (including the radial velocity component $V_r$). On the other hand, the velocity of the wheel at the top point is double the velocity of the wheel's axle (which is also the velocity of the vehicle's body). Augmented with such supplemental velocity profile information, the perception system 132 can not only verify the results of the velocity estimation but can also identify the objects as specific types of objects (e.g., wheels) that are common in particular environments.

Various schemes of disambiguation of the horizontal velocity $V_{0t}$ from the vertical component of the angular velocity $\Omega_s$ in the combination $X_3=V_{0t}+R_0\Omega_s$ can be used in autonomous driving applications. The fact that the two components enter into the same combination means that the translational motion of a vehicle in the rightward (leftward) direction (with respect to the AV) can potentially be obfuscated by the vehicle making a left (right) turn. Conversely, a left (right) turn can be masked by the rightward (leftward) translational motion. In some instances, disambiguation of the two types of motion can be performed using additional information. For example, in the map-assisted disambiguation, it can be known that the road is narrow and straight and, therefore, it can be presumed (as a current hypothesis) that the combination $X_3=V_{0t}+R_0\Omega_s$, arise from the translational velocity $V_{0t}$ while the angular velocity is likely zero, $\Omega_s=0$, or very small. In various implementations, such a hypothesis can be merely one of the hypothesis to be verified with the subsequent sensing frames. Other hypotheses can include the observed vehicle making a sudden U-turn or experiencing a loss of control that is accompanied by spinning across the roadway. As another example, in the map-assisted disambiguation, the angular velocity of rotation $\Omega_s$ of a vehicle that drives around a curved road with a known radius of curvature $R_{CUR}$ can be related to the speed (absolute value of the translational velocity $V_0$) of the vehicle as $V_0=\Omega_s R_{CUR}$, while the speed $V_0$ can be geometrically related to the radial component of the translational velocity $V_{0r}$ based on the angle of view that can be obtained from the known positioning of the AV (and, therefore, its sensing system) relative to the curved road.

Another procedure to disambiguate the latent components—the horizontal velocity $V_{0t}$ from the vertical component of the angular velocity $\Omega_s$—in the combination $X_3=V_{0t}+R_0\Omega_s$ (and, similarly, the velocity $V_{0s}$ from the component of the angular velocity $\Omega_t$ in the combination $X_2=V_{0s}-R_0\Omega_t$, as can be pertinent in e.g., autonomous flying environments) is to make use of the additional sensing frames. A subsequent sensing frame, sensed a time Δt later the first frame can indicate new locations of the reflecting surfaces. For example, the identification of the correspondence between new (subsequent) and old locations of the reflecting surfaces can be performed by segmentation module 182. These new locations can be expected to move in the time interval between the time of the first frame and the time of the second frame with (almost) constant velocities as predicted by the rigid body equation. A comparison of the predicted locations with the actual locations of the reflecting regions can be used for both the disambiguation of the variables and improving accuracy of velocity estimation. Specifically, according to the rigid-body equation, a point of the first frame $\vec{R}$=(r,s,t) is expected to be associated, after time Δτ, with a new location (in the same second coordinate system):

$$\vec{R}_{NEW} = \vec{R} + \vec{V}_0\Delta\tau + \vec{\Omega}\times\vec{R}\Delta\tau.$$

In components, this amounts to (for each point j), $$r_{NEW} = r + (V_{0r} + \Omega_s t - \Omega_t s)\Delta\tau,$$

$$s_{NEW} = s + (V_{0s} + \Omega_t r - \Omega_t t)\Delta\tau,$$

$$t_{NEW} = t + (V_{0s} + \Omega_r s - \Omega_s r)\Delta\tau.$$

Accordingly, the second frame can provide up to 3N additional linear equations bringing up to 4N the number of equations that can be used to determine the six independent variables $(V_{0r}, V_{0s}, V_{0t}, \Omega_r, \Omega_s, \Omega_t)$. The over-determined character of the provided data can be used for more accurate velocity determination, by means of a loss function, as described above, or other methods of statistical analysis.

It should be understood that the above description of the specific coordinates axes and variables used for fitting the velocity data with the rigid body equation is intended for illustration purpose only and that numerous alternative representations are available. For example, instead of the Cartesian coordinates r, s, t, a cylindrical (or spherical) system of coordinates can be used for the second coordinate system. In some implementations, no second coordinate system is used and all coordinates and velocity components are referenced with respect to the first coordinate system. Even though in the above description the angular velocity is referenced via three components along orthogonal axes, in some implementations this need not be the case. For example, the angular velocity $\vec{\Omega}$ can be characterized with Euler's angles, or with any other appropriate choice that uniquely identifies the vector angular velocity $\vec{\Omega}$.

In some implementations, the subsequent coordinates for disambiguation of the latent variables can be, at least partially, obtained using one or more camera(s) 129. For example, where disambiguation between a motion in a transverse direction and a rotation around the vertical axis is to be performed, a camera—being sensitive to lateral visible dimensions of the object—can provide a missing information. Indeed, a purely translational motion of an object results in the opposite edges of an the object's image moving in the same direction (e.g., both edges of the object moving rightward shift to the right between two consecutive camera images) whereas a purely rotational motion around the vertical axis results in the opposite edges moving in the opposite directions. Accordingly, two (or more) camera images taken at different times enable to disambiguate (based on the relative motion of the opposite edges of the visible object and in further view of an angle between the direction to the object and the object's lateral velocity) various latent variables, such as $V_{0t}$ and $\Omega_s$ (and/or variables $V_{0s}$ and $\Omega_r$, in case of a 3D motion). Additionally, camera images can enable determination of the radial angular velocity $\Omega_r$ that is not directly revealed by the radial velocimetry data. As demonstrated by the above equations, the second frame disambiguation also enables to obtain the radial component of the angular velocity $\Omega_r$.

Figure 5:
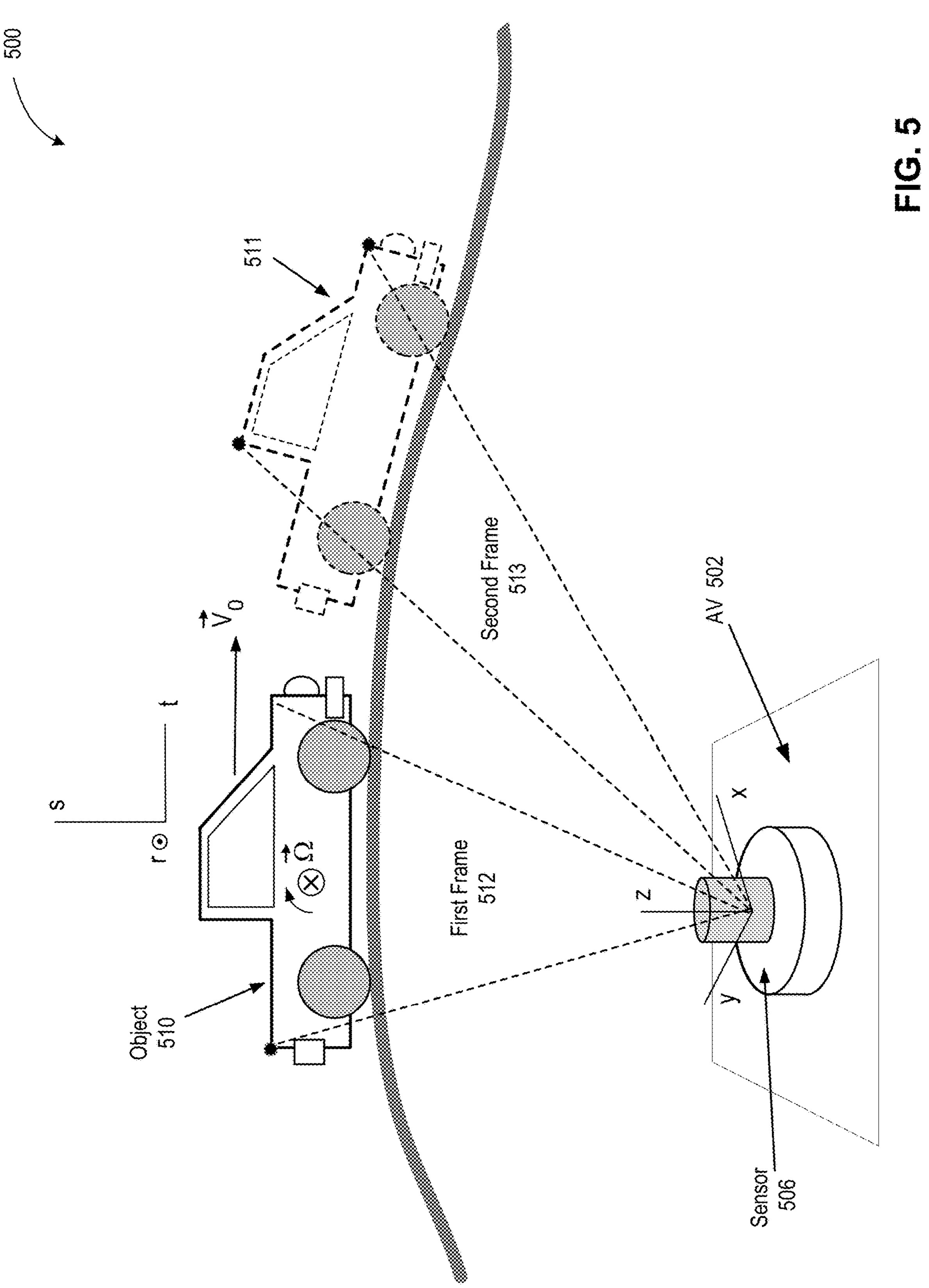
FIG. 5 is an illustration of an augmentation of velocity estimation by sensing data from additional sensing frames, in accordance with some implementations of the present disclosure.

FIG. 5 is an illustration of an augmentation 500 of velocity estimation by sensing data from additional sensing frames, in accordance with some implementations of the present disclosure. Depicted is an object 510 (e.g., a car, a truck, etc.) that is moving horizontally with translational velocity $\vec{V}_0$ (e.g., along the t axis) while simultaneously rotating around the radial axis r with angular velocity $\vec{\Omega}$. The angular velocity, as shown, is caused by an uneven terrain over which the object 510 is traveling. As described above, the single-frame (e.g., first frame 512) radial velocimetry measurements can be agnostic with respect to the angular velocity $\Omega_r$ whereas the lateral velocity $V_{0t}$ can call for a disambiguation from the angular velocity component $\Omega_s$. A second frame 513, which corresponding to a new location 511 of the object 510, can be obtained by a sensor 506 mounted on the AV 502. The sensor 506, which obtains the second frame 513, can be the same sensor as the sensor that obtains the first frame 512, e.g., lidar sensor(s) 122. Alternatively, or additionally, the second frame 513 can be obtained by camera(s) 119. The captured images can indicate the angle of rotation of the object around the radial axis and can further disambiguate the lateral velocity $V_{0t}$ from the angular velocity $\Omega_s$, as described above.

In some implementations, velocity data can be used to track motion of identified objects in the driving environment. More specifically tracking can be performed via a series of frames, each new frame having a new timestamp. For a cluster with a constant number of return points N being tracked, VEM 133 can receive, among other data, 3N coordinates of the reflecting regions and N new radial velocity values. (In some planar environments, 2N two-dimensional coordinates and N radial velocities can be received.) Such additional data can be used by VEM 133 to dynamically track time-dependent velocity $\vec{V}(\tau)$ and angular velocity $\vec{\Omega}(\tau)$ of the rigid object, as well as the object's translational coordinates $\vec{R}_0(\tau)$ (e.g., coordinates of some reference point associated with the object) and angular coordinates $\vec{\phi}(\tau)$ (angles of the body's rotation relative to the reference point). Accordingly, in one implementation, a state of the object at time $\tau$ can be characterized by a state vector, such as $$\hat{Y}^T(\tau) = \left(\vec{R}(\tau), \vec{\phi}(\tau), \vec{V}(\tau), \vec{\Omega}(\tau)\right).$$

In a d-dimensional space, the state vector can have 5d–4 components. For example, a planar (two-dimensional) motion of a car on a flat surface (or a surface with known topography) can be characterized with 6 components: two components of a radius-vector $\vec{R}(\tau)$ (which can be the same as or different than the radius vector of the object's center of rotation $\vec{R}_0$), one angle of rotation $\phi$, two components of the linear velocity $\vec{V}$, and one angular velocity $\Omega=\dot{\phi}$. Similarly, a full three-dimensional motion of an object (e.g., an aircraft) can be characterized with 11 components: three components of the radius-vector $\vec{R}(\tau)$, two component of the unit vector $\vec{\phi}(\tau)$ describing orientation of the object, three components of the linear velocity $\vec{V}$, and three components of the angular velocity $\vec{\Omega}$. Based on the state $\hat{Y}(\tau)$, the state at a subsequent instance of time $\hat{Y}(\tau+\Delta\tau)$ can be predicted from the difference equation $$\hat{Y}(\tau + \Delta\tau) = \hat{F}\hat{Y}(\tau) + \hat{B}\hat{U}(\tau) + \hat{W},$$

where $\hat{F}$ is a state-transition matrix, $\hat{B}$ is a control-input matrix to account for linear and angular accelerations of the system, with $\hat{U}^T(\tau)=(\dot{\vec{V}}(\tau),\dot{\vec{\Omega}}(\tau))$ being a corresponding vector, and $\hat{W}$ describing noise (e.g., Gaussian) of the object's motion. The state-transition matrix $\hat{F}$ and the control-input matrix $\hat{B}$ can embody various equations of motion, such as $$\vec{R}(\tau + \Delta\tau) = \vec{R}(\tau) + \vec{V}(\tau)\Delta\tau + \frac{\dot{\vec{V}}(\tau)(\Delta\tau)^2}{2} + \vec{\rho},$$

$$\vec{V}(\tau + \Delta\tau) = \vec{V}(\tau) + \dot{\vec{V}}(\tau)\Delta\tau + \vec{v},$$

for the translational motion, and, similarly, $$\vec{\phi}(\tau+\Delta\tau)=\vec{\phi}(\tau)+\vec{\Omega}(\tau)\Delta\tau+\frac{\dot{\vec{\Omega}}(\tau)(\Delta\tau)^2}{2}+\vec{\alpha},$$

$$\vec{\Omega}(\tau+\Delta\tau)=\vec{\Omega}(\tau)+\dot{\vec{\Omega}}(\tau)\Delta\tau+\vec{w},$$

for the rotational motion. Quantities $\vec{\rho}$, $\vec{v}$, $\vec{\alpha}$, and $\vec{w}$ represent respective components of the noise $\hat{W}$.

Measurements performed by sensing system can be characterized by a data vector, $$\hat{Z}^T(\tau)=\left(\left\{\vec{R}_j(\tau)\right\},\{V_j(\tau)\}\right)$$

which can be a (d+1)N dimensional vector since for each of the N points (enumerated by subscript j) in the cluster that corresponds to the tracked object, there are d spatial coordinates, $\vec{R}_j(\tau)$, and one radial velocity component $V_j(\tau)$. The data vector $\hat{Z}(\tau)$ is determined by the state vector, $$\hat{Z}(\tau)=\hat{H}\hat{Y}(\tau)+\hat{S}$$

in terms of a measurement matrix $\hat{H}$ (which can be computed, for example, using the rigid-body equation), up to random measurement noise $\hat{S}$.

In some implementations, tracking a motion of the object can be performed by making a prediction (estimate) of the state vector of the object at a later time, $\hat{Y}(\tau+\Delta\tau)$, from its estimate at a previous time, $\hat{Y}(\tau)$, obtaining actual measurement data $\hat{Z}_a$ $(\tau+\Delta\tau)$, identifying the difference with the expected measurement data, $\hat{Z}_a(\tau+\Delta\tau)-\hat{H}\hat{Y}(\tau+\Delta)$, based on the estimated state, and improving the estimate of the state vector, $$\hat{Y}_{imp}(\tau+\Delta\tau)=\hat{Y}(\tau+\Delta\tau)+\hat{K}\left[\hat{Z}_a(\tau+\Delta\tau)-\hat{H}\hat{Y}(\tau+\Delta)\right],$$

using, in one implementation, a Kalman gain matrix K, which may be a rectangular matrix with dimensions (5d−4)×(Nd+N). The Kalman gain matrix may be obtained using the least squared error method by minimizing the difference between the expected and the actual measurement data. The Kalman gain matrix can be expressed via covariance matrices characterizing distribution of components of the state vector and covariance matrices characterizing the measurement noise. At each step of tracking, when a new sensing frame becomes available, VEM 133 can perform such operations as: 1) generate new expected state vector $\acute{Y}(\tau)$ based on a previous estimate $\acute{Y}(\tau-\Delta\tau)$; 2) obtain measurement data $\hat{Z}_a(\tau)$, 3) obtain improved estimate of the state vector $\hat{Y}_{imp}(\tau)$ using a Kalman gain matrix (for the current iteration τ); 4) retrieve covariance matrix $E[\delta\hat{Y}(\tau)\delta\hat{Y}^T(\tau)]$ for deviations of the state vector from its expectation value, $\delta\hat{Y}(\tau)=\hat{Y}(\tau)-E[\hat{Y}^T(\tau)]$ and, possibly, a covariance matrix for the measurement noise; 5) obtain improved covariance matrix using the Kalman gain matrix (for the current iteration τ); 6) generate a new covariance matrix for the next iteration τ+Δτ, based on the improved covariance matrix and using the equations of motion (state-transition matrix); and so on, as long as the object is continued to be tracked.

Figure 6:
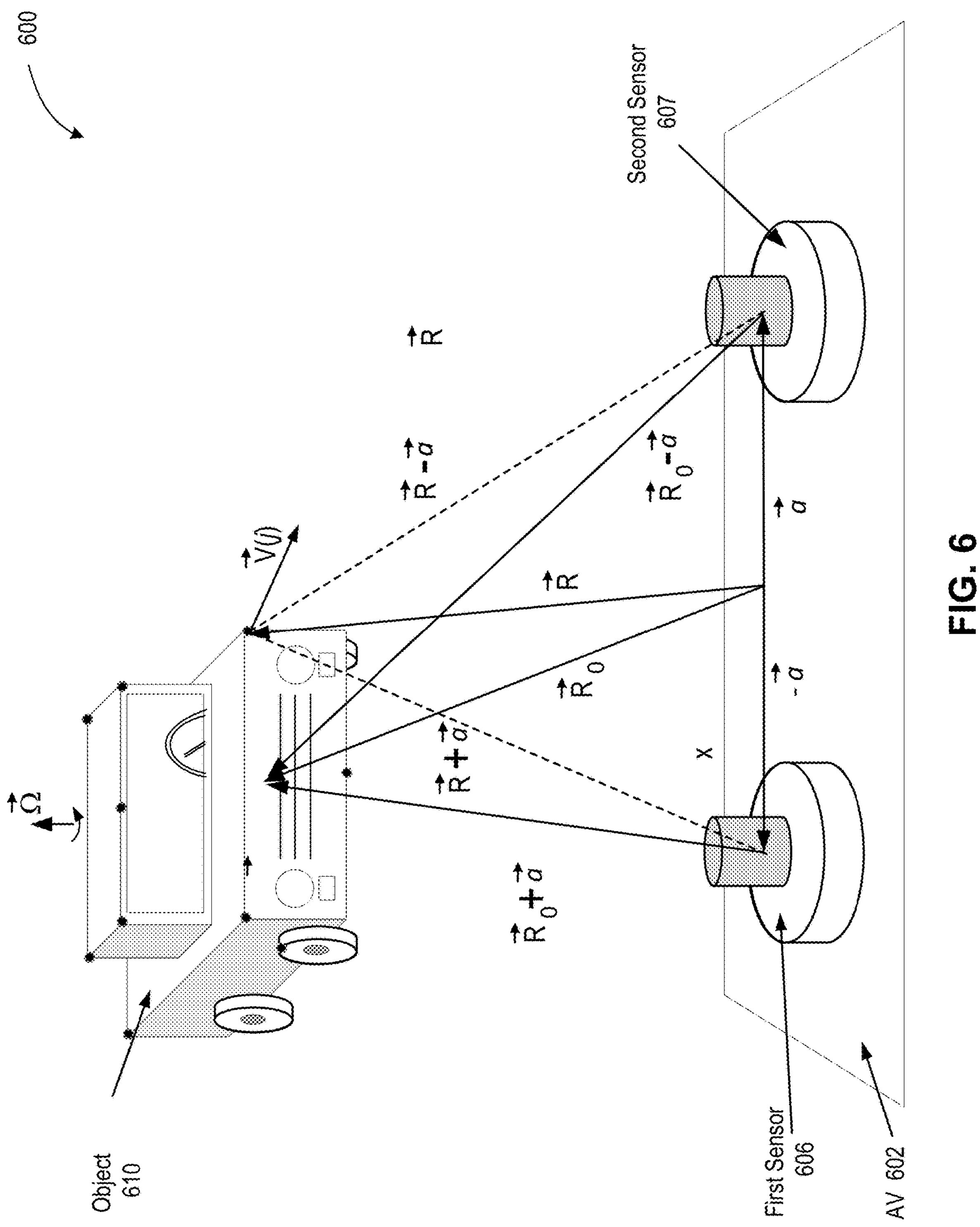
FIG. 6 is an illustration of a double sensor setup for efficient velocity estimation and object mapping, in accordance with some implementations of the present disclosure.

In some implementations, the sensing system 120 can include more than one sensor, e.g., more than one coherent lidar. In such implementations, multiple sensing frames can be obtained simultaneously (provided that frames of different sensors are synchronized). This can allow the perception system 132 to perform the disambiguation faster than in case of a single-sensor system, without waiting for a subsequent frame from either sensor. FIG. 6 is an illustration of a double sensor setup 600 for efficient velocity estimation and object mapping, in accordance with some implementations of the present disclosure. Depicted in FIG. 6 is AV 602 that has multiple coherent lidar sensors (two are shown for specificity), such as a first sensor 606 and a second sensor 607, which can be any type of a coherent (or a combination of a coherent and incoherent) lidar devices capable of sensing the distance to a reflecting surface and the radial velocity of the reflecting surface of an object in the driving environment. The sensors 606 and 607 can scan the driving environment and generate return points corresponding to various objects. Each sensor can output signals that have imparted phase signatures (e.g., chirps or any other phase or frequency modulation features) that are unique to the sensor, so that the return signals from different sensors do not interfere with each other. Sensors 606 and 607 can be located at some distance 2a (the baseline distance) from each other for improved lateral velocity resolution. In some implementations, the baseline distance can be made as large as practical (e.g., as limited by the length or width of AV 602). In some implementations, because lateral velocity resolution has a maximum in the direction perpendicular to the baseline and a minimum in the direction parallel to the baseline, more than two sensors can be utilized, e.g., placed in a non-collinear (e.g., triangular) arrangement. For example, a third sensor can be located near the front or back of the AV 602.

In some implementations, a processing logic of the sensing system (e.g., sensing system 120) can synchronize the sensing frames of sensor 606 and sensor 607 so that the sensing signals are output at the same instances of time, e.g., at τ, τ+Δτ, t+2Δτ, τ+3Δτ, etc. In other implementations, the sensor frames can be staggered (for example, to reduce possible interference or to improve temporal resolution) so that one sensor outputs signals at times τ, τ+Δτ, τ+2Δτ, τ+3Δτ, whereas the other sensor outputs sensing signals at times τ+Δτ/2, τ+3Δt/2, t+5Δτ/2, and so on. Each sensor can obtain its respective return points which can be due to different positioning and timing of the sensing frames-somewhat different from the return points of the other sensor(s) even at the same times. A processing logic of the perception system (e.g., perception system 132) can identify, for each return point $\vec{R}_1$ of the first sensor, the closest return point $\vec{R}_2$ of the second sensor and associate the two points with the same reflecting part of the object 610. In some implementations, the processing logic can approximate that the reflecting part is located at the halfway point, $(\vec{R}_1+\vec{R}_2)/2$.

The motion of the (rigid body) object 610 can be described by the rigid body equation, which can now be projected separately onto the direction of view of the first sensor 606, $\vec{R}+\vec{a}$, and the direction of view of the second sensor 607, $\vec{R}-\vec{a}$. The two respective radial velocities (with the + sign corresponding to the direction from the first sensor and the − sign corresponding to the direction from the second sensor) are, $$V_{r\pm} = \vec{V}_O \cdot \frac{\vec{R}_\pm}{R_\pm} + \left(\vec{R}_{O\pm} \times \vec{\Omega}\right) \cdot \frac{\vec{R}_\pm}{R_\pm},$$

where $\vec{R}_\pm = \vec{R} \pm \vec{a}$, $R_\pm = |\vec{R} + \vec{a}|$, and $\vec{R}_{0\pm} = \vec{R}_0 \pm \vec{a}$. Because for each point there are two radial velocity equations, three points can potentially determine all six components of the translational and the angular velocities of the object 610. Since the two radial directions are different from each other, no latent variables are present in the resulting system of equations. If more than three points are available per moving rigid object, methods of statistical analysis can be used for improving accuracy of the full velocity determination. Other methods described above in relation to a single-sensor setup can be used in the multi-sensor setup as well, such as segmentation and detection of multiple objects within a given cluster of points, formation and verification of hypotheses, object tracking and so on. For example, based on the lateral velocity reconstructed by VEM 133 using the multi-sensor data, the perception system 132 can separate the objects that have similar radial velocities but distinct lateral velocities (e.g., vehicles passing each other in opposite directions). In some instances, accuracy of the lateral velocity determination can be range-specific, higher at lower distances to the objects and lower at longer ranges. For example, if the radial velocity is known with precision $\delta V_r$ (meaning that a measured value $V_r$ indicates that the actual velocity is within the $[V_r - \delta V_r, V_r + \delta V_r]$ interval), the lateral velocity $V_s$ (or $V_t$) can be determined with accuracy $$\delta V_s = \frac{2a}{r} \delta V_r.$$

For example, if $\delta V_r = 0.1$ m/s, the lidar sensors 406 and 407 are located at distance $2a = 1.2$ m, the accuracy of the lateral velocity determination at distance R=60 m would be $\delta V_x = 5.0$ m/s. Such precision can be quite satisfactory to distinguish (based on a single sensing frame) vehicles that move in opposite directions or to distinguish a car and a bicycle (or a pedestrian) regardless of the direction of their motion.

Figure 7:
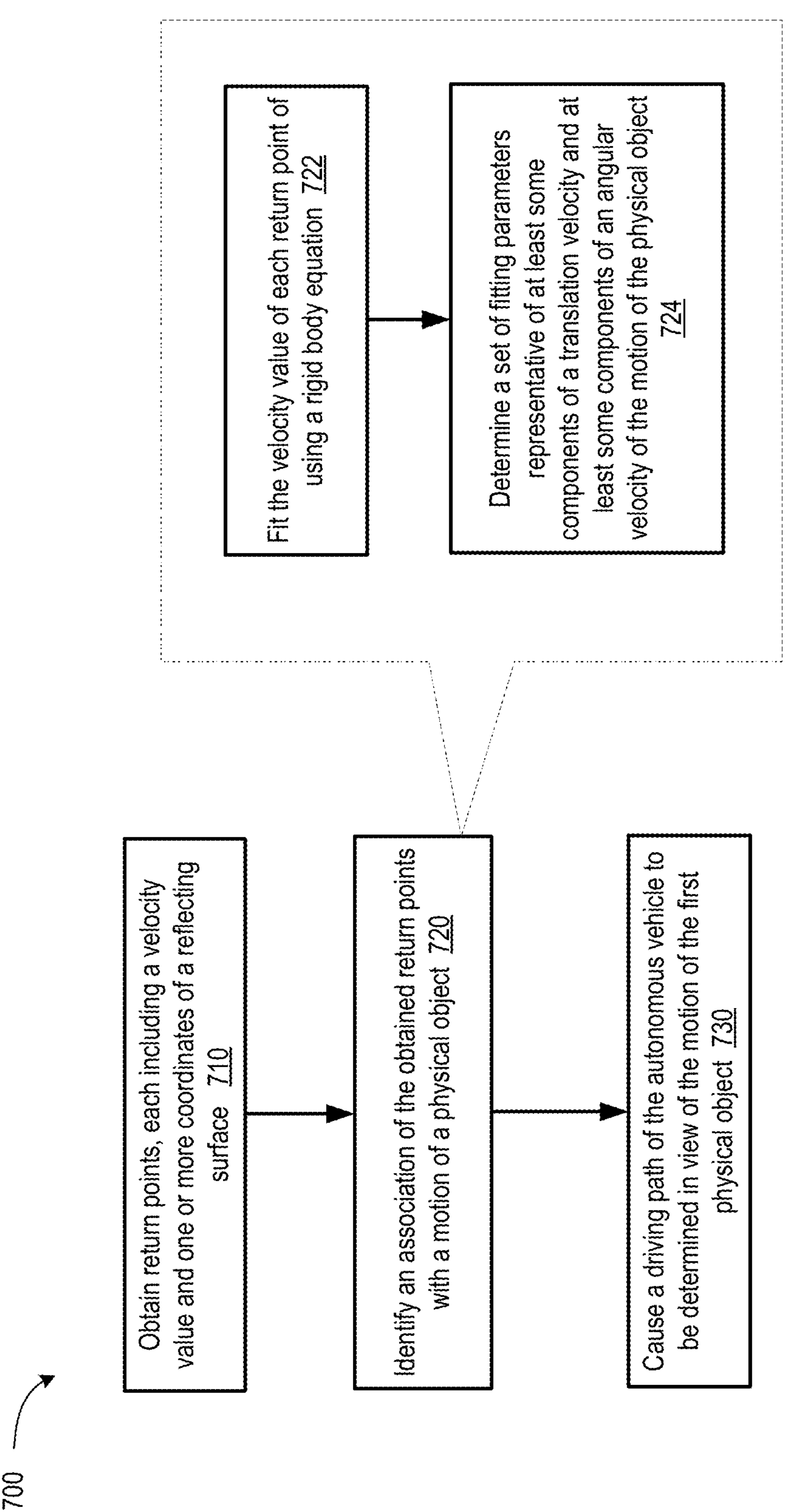
FIG. 7 depicts a flow diagram of an example method of using Doppler-assisted velocity estimation and object tracking for autonomous driving vehicle applications, in accordance with some implementations of the present disclosure.

FIG. 7 depicts a flow diagram of an example method 700 of using Doppler-assisted velocity estimation and object tracking for autonomous driving vehicle applications, in accordance with some implementations of the present disclosure. Method 700, as well as methods 800 and 900 described below, and/or each of their individual functions, routines, subroutines, or operations can be performed by a processing device, having one or more processing units (CPU) and memory devices communicatively coupled to the CPU(s). The processing device executing methods 700, 800, and 900 can perform instructions from various components of the perception system 132, e.g., the VEM 133. In certain implementations, methods 700, 800, and 900 can be performed by a single processing thread. Alternatively, methods 700, 800, and 900 can be performed by two or more processing threads, each thread executing one or more individual functions, routines, subroutines, or operations of the method. In an illustrative example, the processing threads implementing methods 700, 800, and 900 can be synchronized (e.g., using semaphores, critical sections, and/or other thread synchronization mechanisms). Alternatively, the processing threads implementing methods 700, 800, and 900 can be executed asynchronously with respect to each other. Various operations of methods 700, 800, and 900 can be performed in a different order compared with the order shown in FIGS. 7, 8, and 9. Some operations of the methods can be performed concurrently with other operations. Some operations can be optional.

Method 700 can be directed to systems and components of an autonomous driving vehicle, such as the autonomous vehicle 100 of FIG. 1. Method 700 can be used to improve performance of the autonomous vehicle data processing system 130 and/or the autonomous vehicle control system 140. At block 710, method 700 can include obtaining, by a sensing system of an autonomous vehicle (AV), a plurality of return points, each return point comprising a velocity value and one or more coordinates of a reflecting region that reflects a signal emitted by the sensing system. Obtaining return points can include some or all of the following. One or more sensors (e.g., lidar, FMCW, hybrid ToF/coherent lidar, and so on) of the sensing system of the AV can emit a series of signals (e.g., optical signals). The signals can be emitted in a periodic (cyclic) pattern, e.g. by rotating, pivoting, or otherwise scanning transmitters or transmitted beams (e.g., through beam steering, etc.), in various directions, e.g., forming the panoramic pattern. The signals can strike various objects (moving or stationary) and reflect back towards the sensor from various reflecting regions of the objects. The number of reflecting regions can vary depending on the nature, size of the object, the object's level of occlusion by other objects. The intensity of the reflected signals can depend on the kind (material, surface type, etc.) of the reflecting region, the wavelength of the signal, polarization, etc. Based on the characteristics and timing of the reflected signals, the sensing system of the AV can generate a plurality of return points. The return points are data entries that are associated with a reflection of one of the emitted signals from an object of the environment. The return points can be generated in real time. Each return point can include various data entries, such as a timestamp of a cycle of the sensor, intensity of the returned signals, polarization of the returned signals. Each return point can include one or more coordinates of the respective reflecting region. For example, the coordinates can be a distance to the reflecting region (e.g., determined from the time of flight of the returned signals), and one or more directional angles, such as the azimuthal angle specifying direction within the horizontal plane and the polar angle specifying the elevation above (or below) the horizontal plane. Each return point can further include a velocity value; the velocity value can represent the radial component of the velocity of the reflecting region with respect to the radial direction from a transmitter of the sensing system towards the reflecting region.

The sensor can be a coherent light detection and ranging device (lidar) capable of detecting the radial velocity using, e.g., Doppler-assisted sensing. In some implementations, the coherent lidar can be a frequency-modulated continuous-wave lidar and the signals emitted by the sensor can include phase-modulated or frequency-modulated electromagnetic waves. The sensor can also be capable of concurrently emitting various other signals, such as pulsed signals, which can be used for ToF distance measurements. In some embodiments, the sensor can include separate ToF lidar and a coherent lidar, each emitting separate signals that can be synchronized, mixed, and transmitted along the same optical paths.

The return points can belong to (e.g., be associated with) various sensing frames corresponding to different cycles (e.g., revolutions) of the transmitter(s) of the sensing system. For example, a first sensing frame can correspond to a first cycle, a second sensing frame can correspond to a different (e.g., earlier or later) cycle. The terms "first" and "second" should be understood as identifiers only and should not presuppose a specific order. In particular, there can be an arbitrary number of intervening frames between the first frame and the second frame.

At block 720, method 700 can continue with a processing device (e.g., a device executing software instructions issued by velocity estimation module (VEM) 133 as part of the perception system 132) identifying an association of the velocity value and the one or more coordinates of each of the return points with a motion of a physical object. In some implementations, the plurality of return points can be selected from the points in a current frame (e.g., by a segmentation module of the perception system) based on the spatial proximity of the selected points in space, on the proximity of the velocity values associated with the points, on various segmentation algorithms, on various algorithms of point cloud mapping (e.g., ICP mapping) performed between the current frame and some other frame (e.g., a frame preceding or succeeding the current frame) or by any other selecting procedures. In some implementations, the association identified by the processing device can be related to a type of motion performed by the physical object, such as a motion that is a combination of a translational motion and a rotational motion of a rigid body. A rigid body can be a body in which a distance between any two points is fixed. As a result, the motion of such a body can be described with six variables (or fewer than six variables, in cases of a geometrically restricted motion, such as a two-dimensional motion). The six variables can be (1) the three components of the object's translational velocity $\vec{V}$, and (2) the three components of the object's rotational (angular) velocity $\vec{\Omega}$. Additional variables can include coordinates of the center of rotation.

As shown schematically by the blowout section of FIG. 7, identifying the association with the motion of the physical object can be performed by fitting the velocity values and the one or more coordinates of each return point to the rigid body equation (block 722) and using an appropriate set of fitting parameters. The fitting parameters can be representative of at least some components of a translational velocity of the first physical object and at least some components of an angular velocity of the first physical object (block 724). For example, as described in more detail above, the set of parameters (independent variables) $X_1=V_{0r}$, $X_2=V_{0s}-R_0\Omega_t$, and $X_3=V_{0t}+R_0\Omega_s$. In various other implementations, a different set of parameters can be used for fitting (e.g., a set of parameters that is more appropriate for a different system of coordinates being used). The fitting can be performed using the least square error method or any other methods of statistical analysis. Based on the outcome of the fitting, the VEM 133 can determine output values of the fitting parameters $X_1,X_2,X_3$. The output values of $X_1,X_2,X_3$ can be representative of components of the velocities but not necessarily equal to the components themselves. For example, parameter $X_1=V_{0r}$ can be equal to the radial component of the translational velocity whereas parameter $X_3=V_{0t}+R_0\Omega_s$ can be representative of both the horizontal component of the translational velocity $V_{0t}$ and of the vertical component of the angular velocity $\Omega_s$ but not necessarily equal to one of them (unless either the translational or the rotational motion is absent or insignificant, for other reasons). Each of the two components $V_{0t}$ that are not yet fully disambiguated are latent parameters.

At block 730, method 700 can continue with the processing device causing a driving path of the AV to be determined in view of the motion of the first physical object (and, optionally, the second physical object). For example, the perception system could have identified the first subset as an object moving with the speed of 20 mph while making a left-hand turn with the radius of 15 m and communicated this information to the control system (e.g., the AVCS 240). The control system can then determine that the AV is about to enter the same intersection before the object can complete the turn. The control system can determine a new path for the AV, which can include braking, changing lanes, stopping, backing up and so on. The control system can subsequently output instructions to powertrain and steering 150, vehicle electronics 160, signaling 170, etc., to ensure that the AV follows the determined driving path.

Figure 8:
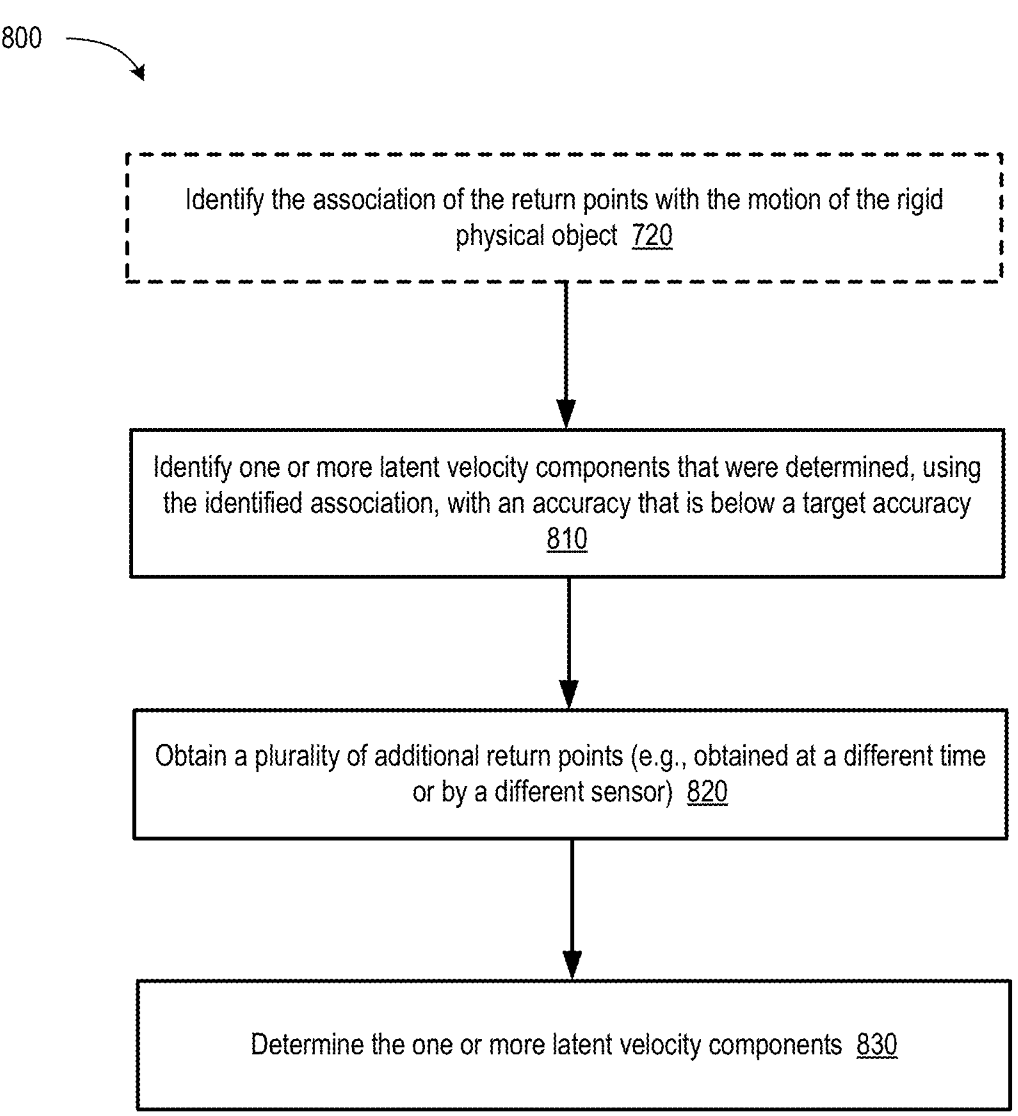
FIG. 8 depicts a flow diagram of an example method of disambiguation of latent velocity components during velocity estimation and object tracking for autonomous driving vehicle applications, in accordance with some implementations of the present disclosure.

FIG. 8 depicts a flow diagram of an example method 800 of disambiguation of latent velocity components during velocity estimation and object tracking for autonomous driving vehicle applications, in accordance with some implementations of the present disclosure. Method 800 can be performed in conjunction with block 720 of method 700 of identifying the association of the first subset of the return points with the motion of the first object. At block 810, the processing device performing method 800 can identify one or more latent velocity components. A latent velocity component can be a component of the translational velocity of the first physical object (or a component of the angular velocity of the first physical object) that was determined, using the first association, with an accuracy that is below a target accuracy. For example, the parameter $X_3=V_{0t}+R_0\Omega_s$ can be determined (e.g., from fitting using the rigid body equation) within a target accuracy, but the specific values of the latent velocity components $V_{0t}$ and $\Omega_s$ may not be known within the target accuracy.

Responsive to identifying one or more latent components, the processing device can perform a series of operations to determine the latent components with the target accuracy. More specifically, at block 820 the processing device performing method 800 can receive a plurality of additional return points. The plurality of additional return points can be obtained by the sensing system similarly to how the original plurality of points was obtained at block 710. In some implementations, the plurality of return points belong to a first sensing frame corresponding to one cycle of a transmitter of the sensing system and the plurality of additional return points belong to a second sensing frame corresponding to a different cycle of the same transmitter of the sensing system, e.g., transmitter 308 of sensor 306, as shown in FIG. 3. In some implementations, the plurality of additional return points are obtained using a second sensor of the sensing system (e.g., second sensor 607 of FIG. 6), the second sensor located differently than the first sensor (e.g., first sensor 606 of FIG. 6).

At block 830, method 800 can continue with the processing device performing determination (disambiguation) of the one or more latent velocity components in view of the identified correspondence using the additional return points, e.g., by fitting the additional return points using the rigid body equation, in one implementation. The outcome of the disambiguation operation can be determination of the one or more latent velocity components, e.g., one or more components of the translational velocity of the first object (e.g., $V_{0r}$, $V_{0s}$) and one or more components of an angular velocity of the physical object (e.g., $\Omega_s$, $\Omega_s$).

Figure 9:
FIG. 9 depicts a flow diagram of an example method of tracking a motion of an object using a motion filter, for autonomous driving vehicle applications, in accordance with some implementations of the present disclosure.
Figure 9:
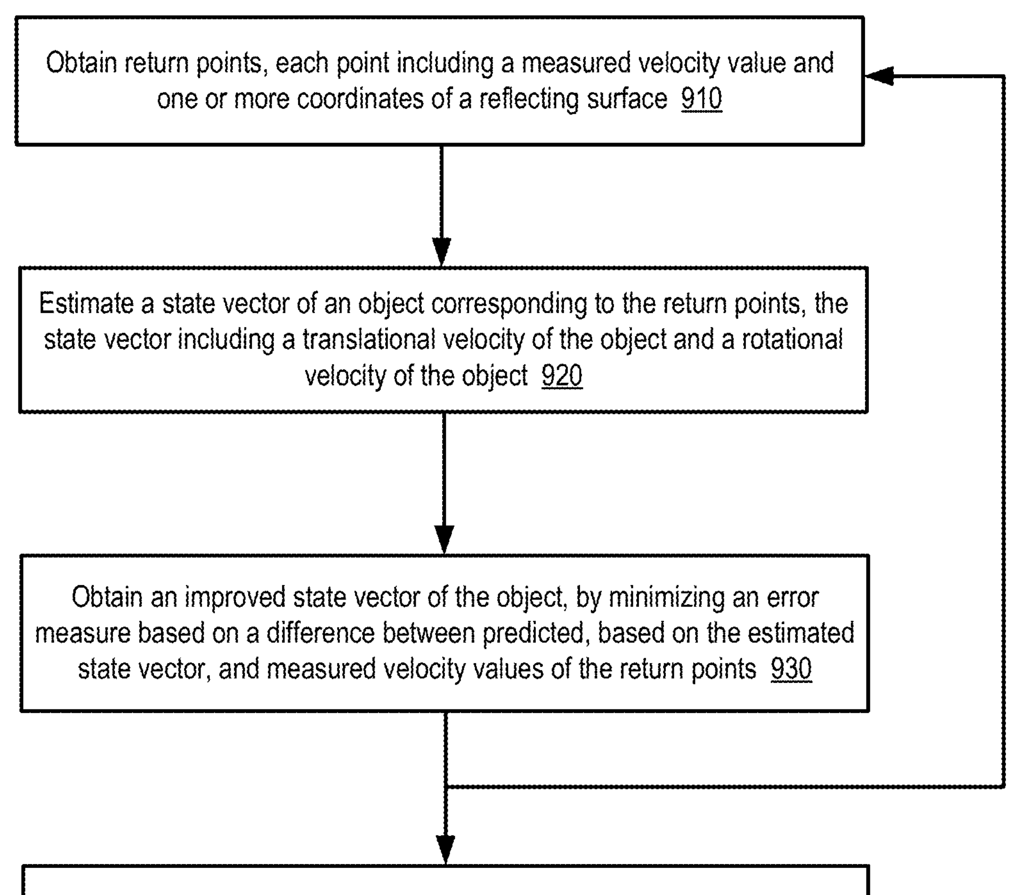

FIG. 9 depicts a flow diagram of an example method 900 of tracking a motion of an object using a motion filter, for autonomous driving vehicle applications, in accordance with some implementations of the present disclosure. Method 900 can be used to improve performance of the autonomous vehicle data processing system 130 and/or the autonomous vehicle control system 140. Method 900 can be performed in association with method 700 or independently of method 700. At block 910 method 900 can include obtaining, by a sensing system of an autonomous vehicle (AV), a first plurality of return points, each return point of the first plurality of points comprising a measured velocity value and one or more measured coordinates of a reflecting region that reflects a respective signal emitted by the sensing system. In some implementations, operations of block 910 can be performed similarly to operations of block 710 of method 700. The first plurality of points can belong to a sensing frame having a timestamp $\tau$.

At block 920, method 900 can continue with estimating a state vector $\acute{Y}(\tau)$ of an object corresponding to the first plurality of return points. The state vector can include a translational velocity $\vec{V}$ of the object (e.g., components of $\vec{V}$ along a chosen system of coordinate axes) and a rotational (e.g., angular) velocity $\vec{\Omega}$ of the object (e.g., components of $\vec{\Omega}$). The state vector can further include coordinates of some point $\vec{R}$ associated with the object, such as some central point near a center of the first plurality of return points. In some implementations, the point $\vec{R}$ can be the object's center of rotation $\vec{R}_0$. The velocity of the translational motion can be defined in conjunction with this center of rotation. For example, velocity $\vec{V}$ can be the velocity of the center of rotation. In some implementations, the state vector can further include various rotational degrees of freedom of the object, such as the object's roll, pitch, and/or yaw angles. Any system of coordinates (including curvilinear systems, such as spherical, cylindrical, elliptic, etc. system of coordinates) can be used.

In some implementations, the state vector $\acute{Y}(\tau)$ can be estimated based on previous sensing data (as part of iterative tracking) obtained using frames $-\Delta\tau$, $\tau-2\Delta\tau$, etc. For example, estimate of the state vector $\vec{Y}(\tau)$ can be based, at least in part, on a second plurality of return points obtained at an earlier time $\tau-\Delta\tau$ compared with the first plurality of return points.

At block 930, method 900 can continue with obtaining an improved state vector $\hat{Y}_{imp}(\tau)$ of the object, by minimizing an error measure. The error measure can include (among other things) a mean squared error (difference) between the measured velocity values of the first plurality of return points and predicted, based on the estimated state vector, velocity values of the first plurality of return points. In some implementations, obtaining the improved state vector $\hat{Y}_{imp}(\tau)$ can include using an estimated covariance matrix for components of the state vector of the object. In some implementations, obtaining the improved state vector can include using a Kalman filter. In some implementations, operations of blocks 910, 920, and 930 can be repeated for additional return points obtained for frames $\tau+\Delta\tau$, $\tau+2\Delta\tau$, $\tau+3\Delta\tau$, etc., to track the object over a desired time horizon, e.g., until the object departs to a large distance, becomes obscured by other objects, and so on. At each tracking iteration, in addition to the state vector and covariance, various other auxiliary quantities can be used and updated, such as Kalman gain matrix, measurement noise covariance matrix, object's motion noise covariance matrix, and the like.

At block 940, method 900 include causing a driving path of the AV to be determined in view of the improved state vector of the object. Operations of block 940 can be performed similarly to operations of block 730 of method 700.

Figure 10:
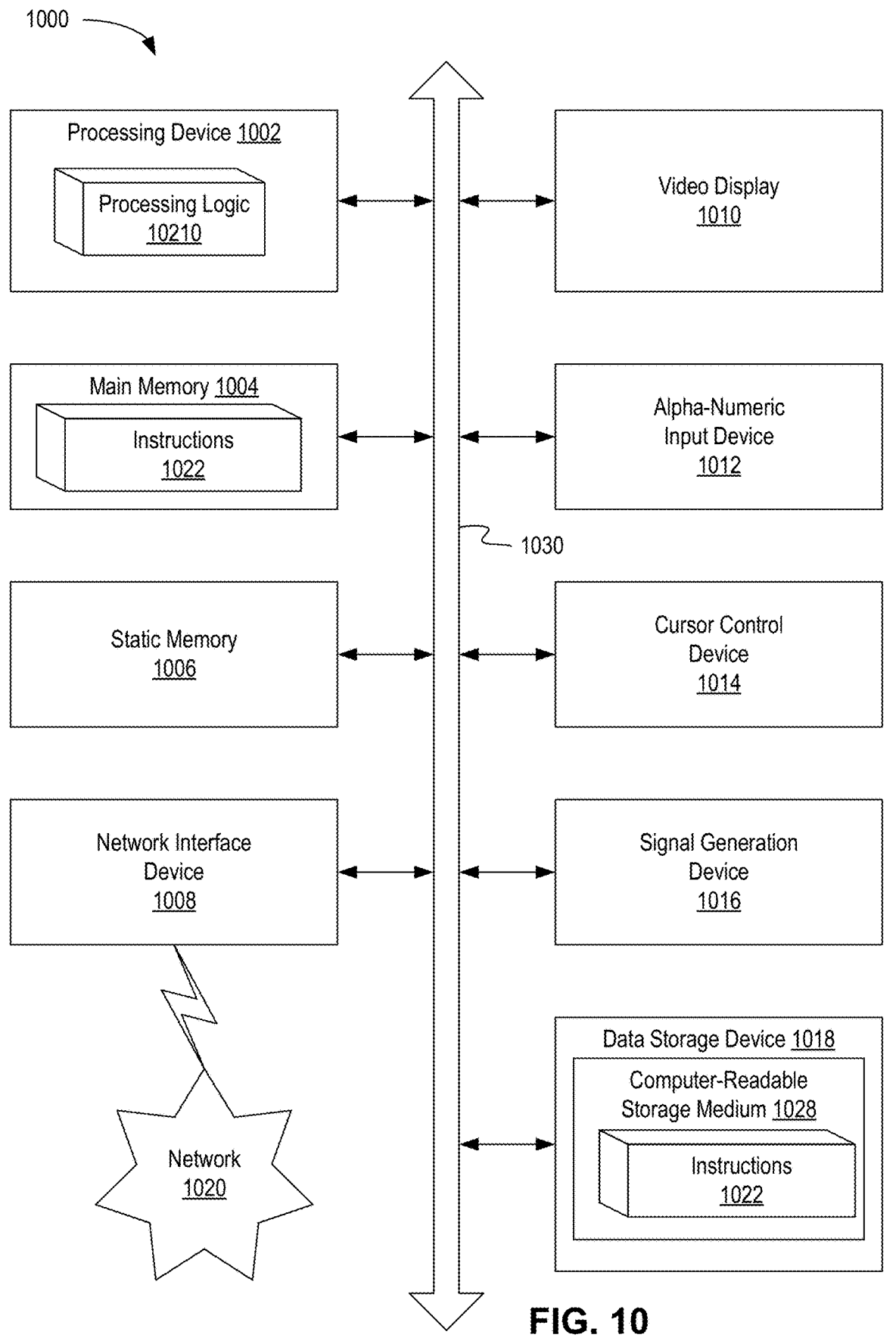

FIG. 10 depicts a block diagram of an example computer device 1000 capable of enabling Doppler-assisted object identification and tracking for autonomous driving vehicle applications. Example computer device 1000 can be connected to other computer devices in a LAN, an intranet, an extranet, and/or the Internet. Computer device 1000 can operate in the capacity of a server in a client-server network environment. Computer device 1000 can be a personal computer (PC), a set-top box (STB), a server, a network router, switch or bridge, or any device capable of executing a set of instructions (sequential or otherwise) that specify actions to be taken by that device. Further, while only a single example computer device is illustrated, the term "computer" shall also be taken to include any collection of computers that individually or jointly execute a set (or multiple sets) of instructions to perform any one or more of the methods discussed herein.

Example computer device 1000 can include a processing device 1002 (also referred to as a processor or CPU), a main memory 1004 (e.g., read-only memory (ROM), flash memory, dynamic random access memory (DRAM) such as synchronous DRAM (SDRAM), etc.), a static memory 1006 (e.g., flash memory, static random access memory (SRAM), etc.), and a secondary memory (e.g., a data storage device 1018), which can communicate with each other via a bus 1030.

Processing device 1002 represents one or more general-purpose processing devices such as a microprocessor, central processing unit, or the like. More particularly, processing device 1002 can be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 1002 can also be one or more special-purpose processing devices such as an application specific integrated circuit (ASIC), a field programmable gate array (FPGA), a digital signal processor (DSP), network processor, or the like. Processing device can include processing logic 1003. In accordance with one or more aspects of the present disclosure, processing device 1002 can be configured to execute instructions performing method 700 of method of using Doppler-assisted velocity estimation and object tracking, method 800 of disambiguation of latent velocity components during velocity estimation and object tracking, and method 900 of tracking a motion of an object using a motion filter, for autonomous driving vehicle applications.

Example computer device 1000 can further comprise a network interface device 1008, which can be communicatively coupled to a network 1020. Example computer device 1000 can further comprise a video display 1010 (e.g., a liquid crystal display (LCD), a touch screen, or a cathode ray tube (CRT)), an alphanumeric input device 1012 (e.g., a keyboard), a cursor control device 1014 (e.g., a mouse), and an acoustic signal generation device 1016 (e.g., a speaker).

Data storage device 1018 can include a computer-readable storage medium (or, more specifically, a non-transitory computer-readable storage medium) 1028 on which is stored one or more sets of executable instructions 1022. In accordance with one or more aspects of the present disclosure, executable instructions 1022 can comprise executable instructions performing method 700 of method of using Doppler-assisted velocity estimation and object tracking, method 800 of disambiguation of latent velocity components during velocity estimation and object tracking, and method 900 of tracking a motion of an object using a motion filter, for autonomous driving vehicle applications.

Executable instructions 1022 can also reside, completely or at least partially, within main memory 1004 and/or within processing device 1002 during execution thereof by example computer device 1000, main memory 1004 and processing device 1002 also constituting computer-readable storage media. Executable instructions 1022 can further be transmitted or received over a network via network interface device 1008.

While the computer-readable storage medium 1028 is shown in FIG. 10 as a single medium, the term "computer-readable storage medium" should be taken to include a single medium or multiple media (e.g., a centralized or distributed database, and/or associated caches and servers) that store the one or more sets of VM operating instructions. The term "computer-readable storage medium" shall also be taken to include any medium that is capable of storing or encoding a set of instructions for execution by the machine that cause the machine to perform any one or more of the methods described herein. The term "computer-readable storage medium" shall accordingly be taken to include, but not be limited to, solid-state memories, and optical and magnetic media.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "identifying," "determining," "storing," "adjusting," "causing," "returning," "comparing," "creating," "stopping," "loading," "copying," "throwing," "replacing," "performing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Examples of the present disclosure also relate to an apparatus for performing the methods described herein. This apparatus can be specially constructed for the required purposes, or it can be a general purpose computer system selectively programmed by a computer program stored in the computer system. Such a computer program can be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The methods and displays presented herein are not inherently related to any particular computer or other apparatus. Various general purpose systems can be used with programs in accordance with the teachings herein, or it may prove convenient to construct a more specialized apparatus to perform the required method steps. The required structure for a variety of these systems will appear as set forth in the description below. In addition, the scope of the present disclosure is not limited to any particular programming language. It will be appreciated that a variety of programming languages can be used to implement the teachings of the present disclosure.

It is to be understood that the above description is intended to be illustrative, and not restrictive. Many other implementation examples will be apparent to those of skill in the art upon reading and understanding the above description. Although the present disclosure describes specific examples, it will be recognized that the systems and methods of the present disclosure are not limited to the examples described herein, but can be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

What is claimed is:

1. A method comprising:

obtaining, by a sensing system of an autonomous vehicle, a plurality of return points, each return point comprising a radial velocity value and one or more coordinates of a reflecting region that reflects a signal emitted by the sensing system;

associating a first subset of the plurality of return points with one or more characteristics of a motion of an object, the one or more characteristics comprising a combination of a rotational velocity of the object and a first component of a translational velocity of the object;

applying a disambiguation scheme to the combination to disambiguate the rotational velocity from the first component of the translational velocity; and causing a driving path of the autonomous vehicle to be modified in view of the one or more characteristics of the motion of the object.

2. The method of claim 1, wherein applying the disambiguation scheme comprises:

using a road curvature to associate the translational velocity of the object with the rotational velocity of the object.

3. The method of claim 1, wherein applying the disambiguation scheme comprises:

obtaining an additional combination of the rotational velocity of the object and the first component of the translational velocity of the object, wherein the additional combination is obtained by associating a second subset of the plurality of return points with the one or more characteristics of the motion of the object, the first subset of the plurality of return points and the second subset of the plurality of return points obtained for different times.

4. The method of claim 3, wherein the first subset of the plurality of return points and the second subset of the plurality of return points correspond to different cycles of a transmitter of the sensing system.

5. The method of claim 1, wherein applying the disambiguation scheme comprises:

estimating the first component of the translational velocity of the object based on a first image of the object at a first time and a second image of the object at a second time.

6. The method of claim 1, wherein associating the first subset of the plurality of return points with the one or more characteristics of the object comprises:

using the one or more characteristics to fit the first subset of the plurality of return points to a rigid-body motion of the object.

7. The method of claim 6, further comprising:

evaluating a degree of fitting of the one or more characteristics to the first subset of the plurality of return points using a loss function that aggregates a plurality of loss values, an individual loss value of the plurality of loss values characterizing a mismatch between a corresponding return point of the first subset of the plurality of return points and the rigid-body motion of the object.

8. The method of claim 1, wherein the plurality of return points are obtained using a lidar sensor of the sensing system of the autonomous vehicle.

9. The method of claim 1, further comprising:

tracking the object across an interval of times using at least the first component of the translational velocity of the object and a second component of the translational velocity of the object, wherein the first component of the translational velocity is associated with a lateral part of the motion of the object and the second component of the translational velocity is associated with a radial part of the motion of the object.

10. A system comprising:

a sensing system of an autonomous vehicle, the sensing system to:

obtain a plurality of return points, each return point comprising a radial velocity value and one or more coordinates of a reflecting region that reflects a signal emitted by the sensing system; and a perception system of the autonomous vehicle, the perception system to:

associate a first subset of the plurality of return points with one or more characteristics of a motion of an object, the one or more characteristics comprising a combination of a rotational velocity of the object and a first component of a translational velocity of the object;

apply a disambiguation scheme to the combination to disambiguate the rotational velocity from the first component of the translational velocity; and cause a driving path of the autonomous vehicle to be modified in view of the one or more characteristics of the motion of the object.

11. The system of claim 10, wherein to apply the disambiguation scheme, the perception system of the autonomous vehicle is to:

use a road curvature to associate the translational velocity of the object with the rotational velocity of the object.

12. The system of claim 10, wherein to apply the disambiguation scheme, the perception system of the autonomous vehicle is to:

obtain an additional combination of the rotational velocity of the object and the first component of the translational velocity of the object, wherein the additional combination is obtained by associating a second subset of the plurality of return points with the one or more characteristics of the motion of the object, the first subset of the plurality of return points and the second subset of the plurality of return points obtained for different times.

13. The system of claim 12, wherein the first subset of the plurality of return points and the second subset of the plurality of return points correspond to different cycles of a transmitter of the sensing system.

14. The system of claim 10, wherein to apply the disambiguation scheme, the perception system of the autonomous vehicle is to:

estimate the first component of the translational velocity of the object based on a first image of the object at a first time and a second image of the object at a second time.

15. The system of claim 10, wherein to associate the first subset of the plurality of return points with the one or more characteristics of the object, the perception system of the autonomous vehicle is to:

use the one or more characteristics to fit the first subset of the plurality of return points to a rigid-body motion of the object.

16. The system of claim 15, wherein the perception system of the autonomous vehicle is further to:

evaluate a degree of fitting of the one or more characteristics to the first subset of the plurality of return points using a loss function that aggregates a plurality of loss values, an individual loss value of the plurality of loss values characterizing a mismatch between a corresponding return point of the first subset of the plurality of return points and the rigid-body motion of the object.

17. The system of claim 10, wherein the plurality of return points are obtained using a lidar sensor of the sensing system of the autonomous vehicle.

18. The system of claim 10, wherein the perception system of the autonomous vehicle is further to:

track the object across an interval of times using at least the first component of the translational velocity of the object and a second component of the translational velocity of the object, wherein the first component of the translational velocity is associated with a lateral part of the motion of the object and the second component of the translational velocity is associated with a radial part of the motion of the object.

19. An autonomous vehicle comprising:

a sensing system configured to:

obtain a plurality of return points, each return point comprising a radial velocity value and one or more coordinates of a reflecting region that reflects a signal emitted by the sensing system; and a perception system configured to:

associate a first subset of the plurality of return points with one or more characteristics of a motion of an object, the one or more characteristics comprising a combination of a rotational velocity of the object and a first component of a translational velocity of the object;

apply a disambiguation scheme to the combination to disambiguate the rotational velocity from the first component of the translational velocity; and cause a driving path of the autonomous vehicle to be modified in view of the one or more characteristics of the motion of the object.

20. The autonomous vehicle of claim 19, wherein to apply the disambiguation scheme, the perception system is configured to perform at least one of:

use a road curvature to associate the translational velocity of the object with the rotational velocity of the object;

obtain an additional combination of the rotational velocity of the object and the first component of the translational velocity of the object, wherein the additional combination is obtained by associating a second subset of the plurality of return points with the one or more characteristics of the motion of the object, the first subset of the plurality of return points and the second subset of the plurality of return points obtained for different times; or estimate the first component of the translational velocity of the object based on a first image of the object at a first time and a second image of the object at a second time.

* * * * *